United States Patent
Apte et al.

(10) Patent No.: US 10,182,460 B2
(45) Date of Patent: Jan. 15, 2019

(54) MULTITENANCY GAMING SERVICES PLATFORM

(71) Applicant: Zynga Inc., San Francisco, CA (US)

(72) Inventors: Ajinkya Apte, San Mateo, CA (US); Bruce Sherrod, San Francisco, CA (US); Matthew Leventi, San Francisco, CA (US); Suryaveer Singh Lodha, Berkeley, CA (US); Matthew John Alberts, San Francisco, CA (US); Tim Sullivan, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 190 days.

(21) Appl. No.: 15/069,193

(22) Filed: Mar. 14, 2016

(65) Prior Publication Data
US 2017/0264681 A1   Sep. 14, 2017

(51) Int. Cl.
| | | |
|---|---|---|
| H04L 29/08 | (2006.01) | |
| H04W 76/11 | (2018.01) | |
| H04W 12/08 | (2009.01) | |
| A63F 13/00 | (2014.01) | |
| A63F 13/73 | (2014.01) | |
| A63F 13/352 | (2014.01) | |

(Continued)

(52) U.S. Cl.
CPC .............. *H04W 76/11* (2018.02); *A63F 13/00* (2013.01); *A63F 13/352* (2014.09); *A63F 13/71* (2014.09); *A63F 13/73* (2014.09); *H04L 67/104* (2013.01); *H04L 67/12* (2013.01); *H04W 12/08* (2013.01); *A63F 13/798* (2014.09)

(58) Field of Classification Search
CPC .................................................. H04L 67/1074
USPC .......................................................... 709/205
See application file for complete search history.

(56) References Cited

U.S. PATENT DOCUMENTS

| | | | | |
|---|---|---|---|---|
| 2009/0143128 | A1* | 6/2009 | Cautley | .................. G07F 17/32 463/17 |
| 2015/0180859 | A1* | 6/2015 | Kawakami | .......... H04L 63/0815 726/8 |

OTHER PUBLICATIONS

"Getting Started with PlayFab", PlayFab, Inc, [Online]. Retrieved from the Internet: <URL:https://api.playfab.com/docs/getting-started-with-playfab, (2015), 6 pgs.

(Continued)

*Primary Examiner* — Adnan M Mirza
(74) *Attorney, Agent, or Firm* — Schwegman Lundberg & Woessner, P.A.

(57) ABSTRACT

Systems and methods for providing multitenancy gaming platform services are presented. In one embodiment a method for providing multitenancy gaming platform services comprises receiving, at a server computer, a request from one of a plurality of applications for an operation associated with a service, the request including a token, data related to an application, and a target user identifier. The method further comprises, decoding the token to determine an application identifier and a user identifier. The method further comprises, determining which service of a plurality of multitenancy gaming platform services is requested, and sending the data related to the application to a second server computer responsible for the service, wherein the operation is authorized by the second server computer based on the user identifier and target user identifier. The method further comprises receiving a response from the second server computer responsible for the service, indicating a status of the operation.

20 Claims, 11 Drawing Sheets

(51) Int. Cl.
*A63F 13/71* (2014.01)
*A63F 13/798* (2014.01)

(56) References Cited

OTHER PUBLICATIONS

"Leaderboards", Play Games Services—Google Developers, [Online]. Retrieved from the Internet: <URL:https://developers.google.com/games/services/common/concepts/leaderboards, (Jan. 21, 2016), 10 pgs.

* cited by examiner

MULTITENANCY GAMING SERVICES PLATFORM

BACKGROUND

There are many technical inefficiencies with how resources and components for games and applications are currently developed and maintained. For example, Game A may have its own team of engineers, its own set of servers to store game states, its own solutions for alliances within the game or keeping track of scores, etc. Game B may also have its own team of engineers, its own set of servers to store game states, its own solutions for alliances within the game or keeping track of scores, etc. There is no way to easily develop or maintain a game or application utilizing similar resources or components.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
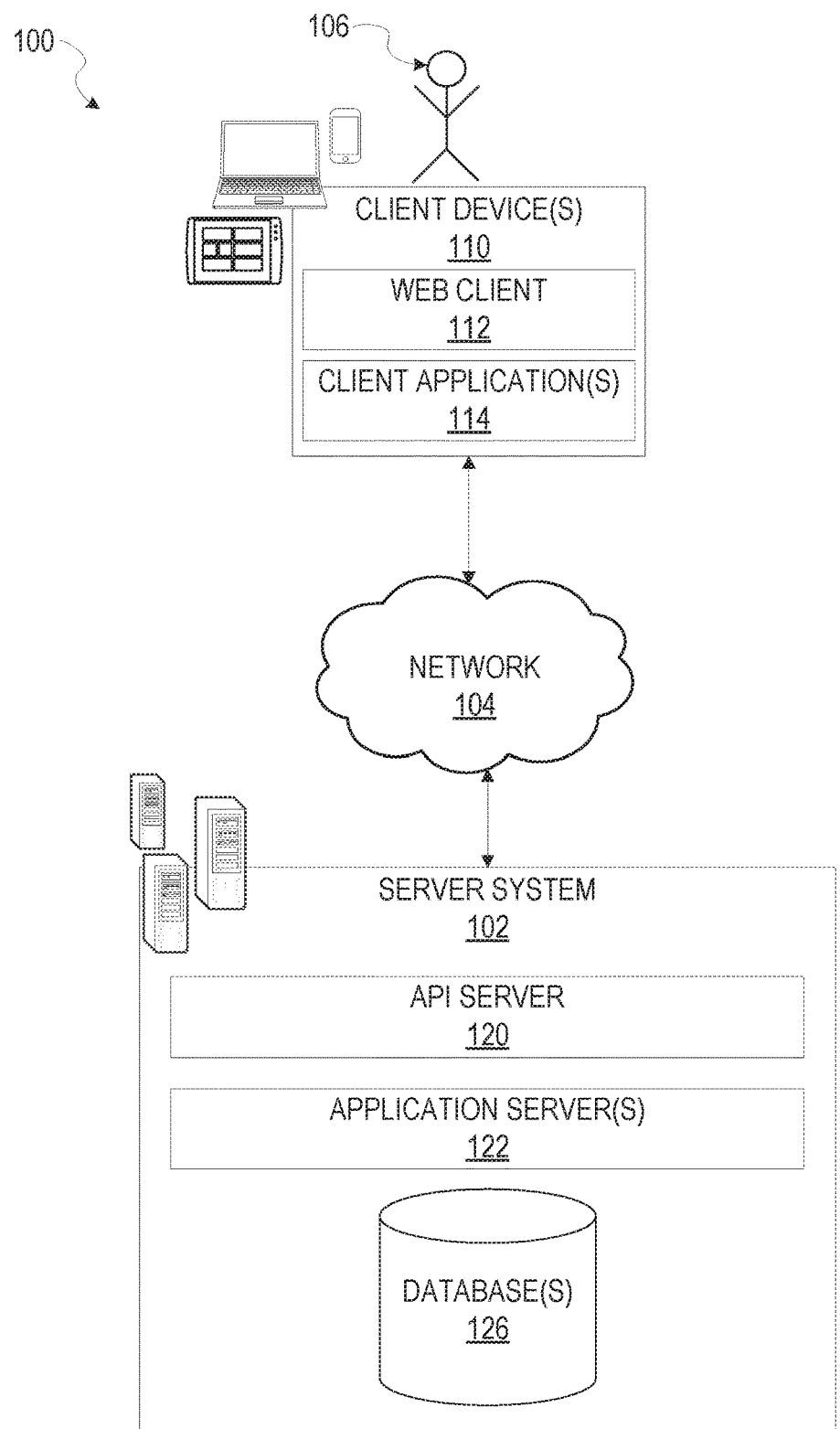
FIG. 1 is a block diagram illustrating a networked system for a multitenancy gaming services platform, according to some example embodiments.

As described above, there are many technical inefficiencies with how games and applications are currently developed. Games are either developed and maintained individually using resources and components specific to each game, or a software development kit (SDK) must be downloaded and incorporated into a game that may include many unnecessary features and functionality. For example, a developer may want to use functionality provided by a third party SDK. To do so, the developer must download the SDK for each development system (e.g., Unity, Unreal, etc.) or operating system (e.g., Android, iOS, Windows, etc.) the developer plans to use or support with the application he is developing. Once he downloads the SDK he must incorporate the SDK into his development environment. And then to utilize the SDK, he must compile it into his code and ship it as part of his application. This is not just a cumbersome process, but also creates a much larger code and application size. The size of the application may especially be an issue for applications developed devices where storage is constrained.

Moreover, any time there is an update to the SDK, the developer must download the new version of the SDK and may need to update code for his application to comply with the new version of the SDK. Moreover, the developer must re-compile his code with the new version and do a new QA (quality assurance) process to test the application with the new SDK. If there are any issues he must troubleshoot, contact the third party, etc. Since the developer has no control over or insight into the code of the SDK, he must rely upon a third party to resolve any issues. And, since he does not control the development cycle of the SDK, he must do a new application version development and QA process whenever there is a new version of an SDK.

Furthermore, the SDK may provide any number of functionality. For example, the SDK may provide functionality for fifty features, but the developer may only need one feature. But the developer has no control over the number of features or the size of the code for the SDK.

Systems and methods described herein relate to multitenancy gaming platform services and provide common services to a plurality of different entities for developing a plurality of different games. The entities may he separate legal entities (e.g., different companies, separate individual developers, etc.) and there may be many different types of games developed by the different companies, individual developers, etc. To address inefficiencies with current development and maintenance models, systems and methods are described herein to provide an interface to a plurality of common services that can be utilized for game or application development and maintenance for multiple different games and/or applications. A developer (e.g., a company or individual developer) may start using the services within his game immediately, without need to download and maintain an SDK. For example, a developer may simply obtain an application identifier for his application and immediately begin making calls in his application via an application programming interface (API) to store game states, create and maintain scores and leaderboards, manage buying and selling assets within a game, manage core aspects of a guild or group of users, etc. A developer may pick and choose what services will be used in each game developed, and no SDK is required or necessary. Accordingly, the developer has control over what services he would like to utilize in his application, the development process (e.g., new version, QA process, etc.), the size of his code and application, etc. Moreover, the system is platform agnostic.

Accordingly, systems and methods described herein enable a developer or game/application provider to utilize application services without having its own dedicated infrastructure for providing these services. This allows a developer to quickly implement and release an application or game with minimal development, infrastructure, and cost.

In one embodiment, a method for providing multitenancy gaming platform services, comprises receiving, at a first server computer, a request from one of a plurality of applications, for an operation associated with a service, the request including a token, data related to an application, and a target user identifier. The method further comprising decoding, by the first server computer, the token to determine an application identifier and a user identifier, authenticating, by the first server computer, the application identifier and user identifier, and authorizing, by the first server computer, the operation based on the user identifier and target user identifier. The method further comprising determining, by the first server computer, which service of a plurality of multitenancy gaming platform services is requested, sending, by the first server computer, the data related to the application to a second server computer responsible for the service, and receiving, by the first server computer, a response from the second server computer responsible for the service, indicating a status of the operation.

In another embodiment, the request may be a first request, and the application may be a first application. The method may further comprise receiving a second request from a second application of a plurality of applications, for an operation associated with a service, the request including a second token, data related to the second application, and a second target user identifier. The method may further comprise decoding, by the first server computer, the token to determine a second application identifier and a second user identifier, authenticating, by the first server computer, the second application identifier and second user identifier, and authorizing, by the first server computer, the operation based on the second user identifier and second target user identifier. The method further comprising, determining, by the first server computer, which service of a plurality of multitenancy gaming platform services is requested, sending, by the first server computer, the data related to the second application to a third server computer responsible for the service, and receiving, by the first server computer, a response from the third server computer responsible for the service, indicating a status of the operation.

FIG. 1 is a block diagram illustrating a networked system 100 configured for multitenancy gaming services, according to sonic example embodiments. The system 100 may include one or more client devices such as client device(s) 110. The client device(s) 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, computers in vehicles, or any other communication device that a user may utilize to access the networked system 100. In some embodiments, the client device(s) 110 may comprise a display module (not shown) to display information (e.g., in the form of user interfaces). In further embodiments, the client device(s) 110 may comprise one or more of touch screens, accelerometers, gyroscopes, cameras, microphones, global positioning system (GPS) devices, and so forth.

The client device(s) 110 may be a device of a user 106, such as game or application developer, or a user or player of a game or application, which is used to develop games or applications or play or use games or applications. In one embodiment, the system 100 is a multitenancy gaming services platform that receives requests for services from a plurality of client devices 110 and provides services to the plurality of client devices 110. The terms "user" and "player" may be used interchangeably throughout this application.

One or more users 106 may be a person, a machine, or other means of interacting with the client device(s) 110. In example embodiments, the user 106 may not be part of the system 100, but may interact with the system 100 via the client device(s) 110 or other means. For instance, the user 106 may provide input (e.g., touch screen input or alphanumeric input) to the client device(s) 110 and the input may be communicated to other entities in the system 100 (e.g., server system 102) via the network 104. In this instance, the other entities in the system 100, in response to receiving the input from the user 106, may communicate information to the client device(s) 110 via the network 104 to be presented to the user 106. In this way, the user 106 may interact with the various entities in the system 100 using the client device(s) 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device(s) 110 may access the various data and applications provided by other entities in the system 100 via web client 112 (e.g., a browser, such as the Internet Explorer® browser developed by Microsoft® Corporation of Redmond, Wash. State) or one or more client applications 114. The client device(s) 110 may include one or more client applications 114 (also referred to as "apps") such as, but not limited to, a web browser, messaging application, electronic mail (email) application, an e-commerce site application, a mapping or location application, a time management application, a game, and the like. In some embodiments, one or more client applications 114 may be included in a given one of the client device(s) 110, and configured to locally provide the user interface and at least some of the functionalities, with the client application(s) 114 configured to communicate with other entities in the system 100 (e.g., server system 102), on an as needed basis, for data and/or processing capabilities not locally available (e.g., access a time management system, to authenticate a user 106, to verify a method of payment, etc.). Conversely, one or more client applications 114 may not be included in the client device(s) 110, and then the client device(s) 110 may use its web browser to access the one or more applications hosted on other entities in the system 100 (e.g., server system 102).

A server system 102 may provide server-side functionality via the network 104 (e.g., the Internet or wide area network (WAN)) to one or more client devices 110. The server system 102 may be a cloud computing environment according so some example embodiments.

The server system 102 may include an application program interface (API) server 120 and one or more application servers 122, which may be communicatively coupled with one or more databases 126. Database(s) 126 may be storage devices that store information such as game states, scores, application identifiers, user identifiers, etc. The server system 102 may interact with one or more client devices 110 to provide services to one or more client applications 114 on the one or more client devices 110.

The API server 120 may receive a plurality of requests for services from a plurality of client devices 110, authenticate and/or authorize such services, and send the requests to the appropriate application server(s) 122 with which the services are associated.

Figure 2:
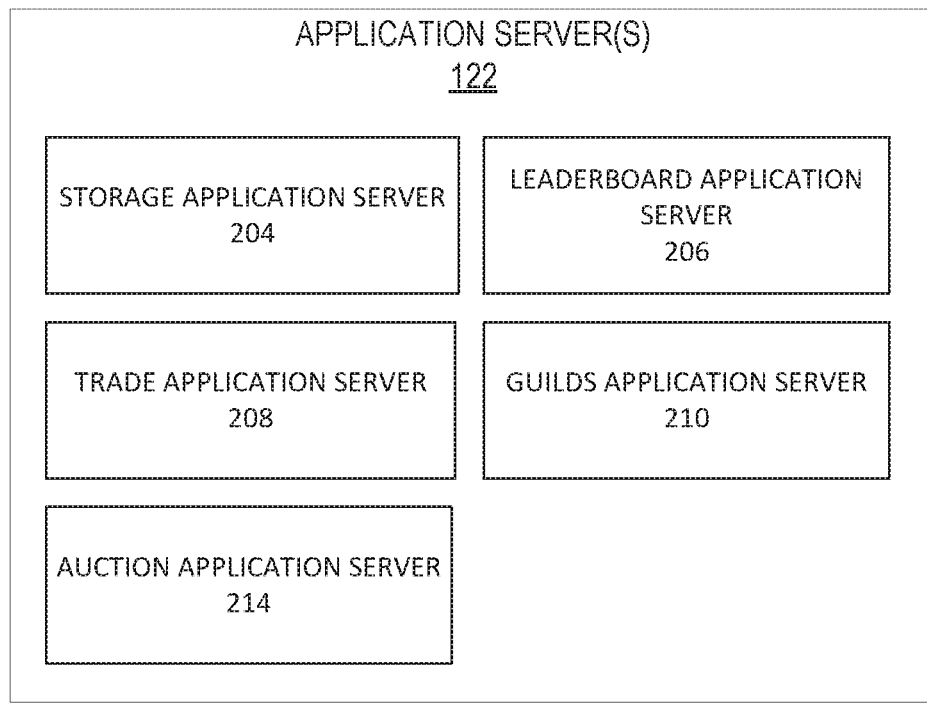
FIG. 2 is a block diagram illustrating example application servers, according to some example embodiments.

The application server(s) 122 may comprise a plurality of application servers related to particular services. Some example application servers are shown in FIG. 2. A storage application server 204 may be associated with storage services to provide game storage (e.g., save game) functionality for web and mobile games (for example). A leaderboard application server 206 may provide mechanisms for creating leaderboards and managing user scores. A trade application server 208 may provide services associated with user-to-user trading or buying items in a game or application. A guilds application server 210 may provide functionality to manage core aspects of a guild, clan, or group of users. An auction application server 214 may provide a way to buy and sell in-game items.

As explained above, a user does not need to download an SDK or develop and maintain individual components for each game he develops. Instead, the systems and method described herein provide an interface to a plurality of common services that can be utilized for any game or application development and maintenance. A developer may start using the services within his game immediately, without need to download and maintain an SDK. Accordingly, the developer's application does not include an SDK source code and operates as an application without an integrated SDK for the services. For example, a developer may simply obtain an application identifier for his application and immediately begin making calls in his application via an application programming interface (API) to store game states, create and maintain scores and leaderboards, manage buying and selling assets within a game, manage core aspects of a guild or group of users, etc.

Figure 3:
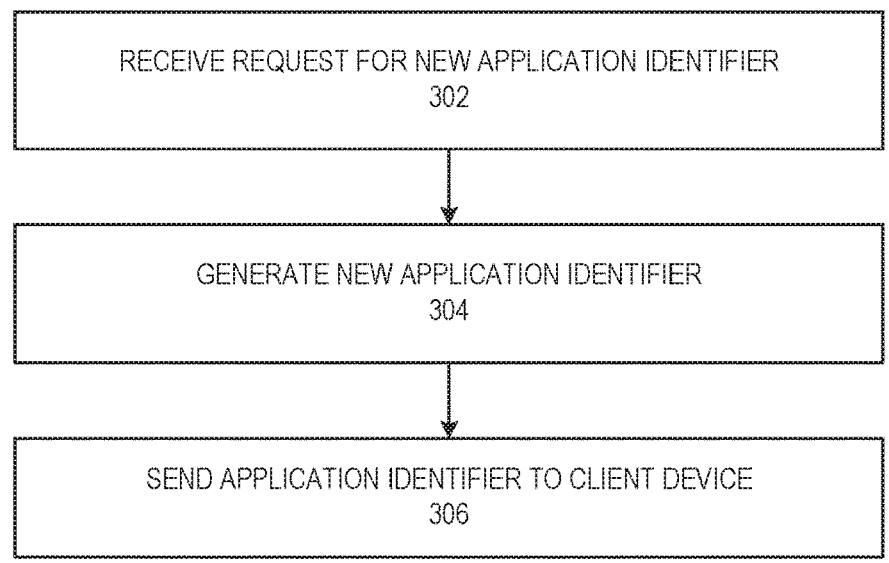
FIG. 3 is a flowchart illustrating aspects of a method for requesting and generating an application identifier, according to some example embodiments.

FIG. 3 is a flow chart illustrating aspects of a method 300 for requesting and generating an application identifier, according to some example embodiments. For illustrative purposes, method 300 is described with respect to the networked system 100 of FIG. 1. It is to be understood that method 300 may be practiced with other system configurations in other embodiments.

In operation 302, the server system 102 may receive a request for a new application identifier. For example, a game or application developer may want to start using the services provided by server system 102. The developer may access an application, web portal, web application, make a simple call (e.g., a CURL call), or other means via a client device 110 to request a new application identifier. The developer may provide a name for the app for which he is requesting a new application identifier. The client device 110 sends the request to the server system 102. The server system 102 may then generate a new application identifier (e.g., via an application server), as shown in operation 304. For example, an application server 122 may determine an application identifier that is not yet in use e.g., 5001341) and then send the application identifier to the client device, as shown in operation 306. The application server 122 may store the application identifier in one or more databases 126 along with any other information provided (e.g., a name of the app associated with the application identifier, etc.). The developer may then begin utilizing services provided by the server system 102 using the application identifier and including calls to the service(s) within the application.

Tokens may be used to authenticate a client device, application identifier, user identifier, etc. For example, when an application or game first starts on a client device, it may send a request for a new token. The request may include a user identifier associated with the end user that is using the application or playing the game. The request may also include the application identifier for the application or game. The server system 102 may receive the request for a new token and generate a new token including the user identifier.

The server system 102 may then send the new token to the client device 110. The application or game may then use the token when making requests for services provided by the server system 102. The token may expire after a predetermined amount of time (e.g., duration of game play or application use, 24 hours, 48 hours, etc.). When a token expires, the application or game may make a request for a new token.

Figure 4:
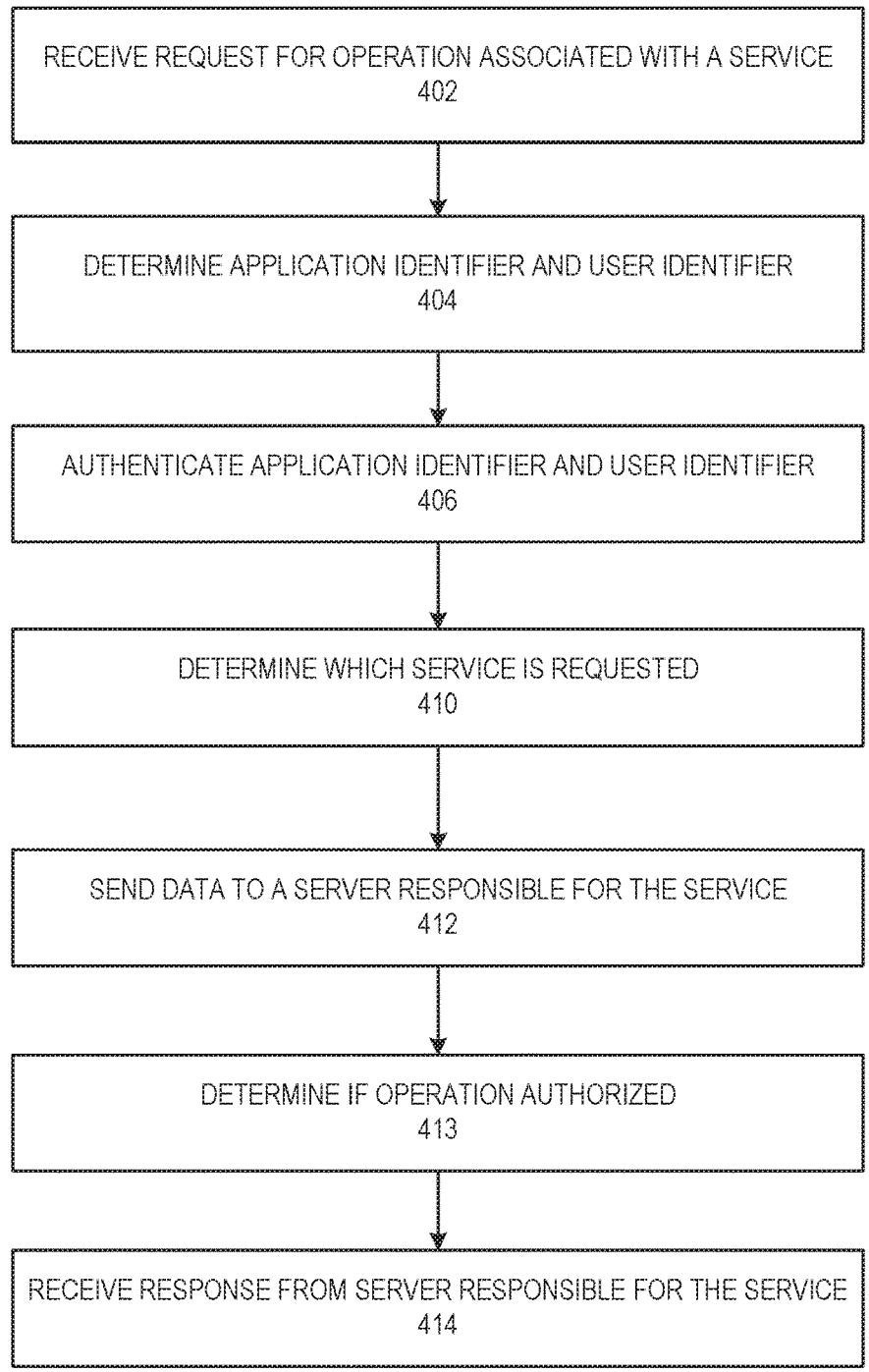
FIG. 4 is a flowchart illustrating aspects of a method for receiving and processing a request for an operation associated with a service, according to some example embodiments.

FIG. 4 is a flow chart illustrating aspects of a method 400 for receiving and processing a request for an operation associated with a service, according to some example embodiments. For illustrative purposes, method 400 is described with respect to the networked system 100 of FIG. 1. It is to be understood that method 400 may be practiced with other system configurations in other embodiments.

In operation 402, the server system 102 (e.g., via API server 120) may receive a request for an operation associated with a service. The request may be sent by an application or game via a client device 110. As described above the application or game does not include or implement an SDK to utilize the services provided by the server system 102. The request may include a token and data related to the application or game. In some embodiments, the request may also include a target user identifier.

API server 120 may determine an application identifier and a user identifier, as shown in operation 404, by decoding the token. In operation 406, the API server 120 may authenticate the application identifier and user identifier. For example, the API server 120 may look up the application identifier and user identifier in one or more databases 126 to determine that the application identifier and user identifier actually exist.

In operation 410, the API server 120 may determine which service is requested. For example, the API server 120 may parse or analyze the request received from the client device 110 to determine the service (e.g., storage, leaderboards, trade, guilds, auction, etc.). Examples of specific services are described in further detail below.

In operation 412, the API server 120 may send the data related to the application (and any additional information necessary to perform the operation) to an application server 122 responsible for the service (e.g., storage application server 204, leaderboards application server 206, trade application server 208, guilds application server 210, etc., shown in FIG. 2).

In one example embodiment, the application server 122 responsible for the server (e.g., storage application server 204, leaderboards application server 206, trade application server 208, guilds application server 210, etc., shown in FIG. 2) may determine if the operation is authorized, as shown in operation 413. For example, some services may require that the user identifier and target identifier match in order for an operation to be conducted. A target user identifier may be an identifier associated with user data for which the operation is requested to act upon. For example, the user identifier may be user identifier 1, and an application may want to update application data for target user identifier 1. If the application server 122 determines that the requested operation requires that the user identifier and target user identifier match, the application server 122 will authorize the operation since user identifier 1 and target user identifier 1 match. In another example, the user identifier may be user identifier 2, and an application may want to update application data for target user identifier 1. If the application server 122 determines that the requested operation requires that the user identifier and target user identifier match, the application server 122 will not authorize the operation since user identifier 2 and target user identifier 1 do not match (e.g., and so the operation will not be allowed). If the application server 122 determines that the requested operation does not require that the user identifier and target user identifier match, the application server 122 may authorize either of the above examples, even if the identifiers do not match, since it does not matter if the identifiers match.

The application server 122 responsible for the service will perform the requested operation and return a status to the API server 120. For example, the status may include a status code and/or message that indicates the operation was completed, the operation failed, etc.

At operation 414, the API server 120 may receive the response from the application server 122 responsible for the service. The API server 120 may send the status response to the client device 110. The client device 110 may display the status response to the user (e.g., user 106), if appropriate.

There are a number of services that may be provided by server system 102. In one example embodiment, the server system 102 may provide storage services (e.g., via storage application server 204). The storage services may provide game storage (e.g., save game) for applications and games (e.g., web and mobile games). This service may be used by client authoritative and non-client authoritative web and mobile games. A developer may start interacting with this server within a matter of minutes utilizing an API (e.g., via API server 120 and as described above). Service usage and all service relevant metrics may be fully transparent to the application or game team.

A game client may determine how often to send data for storage (e.g., every 45 seconds, every 90 seconds, every 5 minutes, etc.). The system 102 does not need to know how often the game client will send data. Moreover a game client may decide the format in which it would like to store the data (e.g., in what JavaScript Object Notation (JSON) format). Again, the system 102 does not need to know the format, it just stores the data received. The data may be retrieved by the game client whenever it wants.

The storage service may utilize a "Check and Set" (CAS) value. CAS is a way to perform luckless memcache operations. Every key stored in membase has a CAS value associated with it. To perform an update, the caller (e.g., an application or game via a client device 110) may need to provide a CAS value along with the data to update. The service may require that the CAS value matches to perform the update operation. For example, when making a request for an operation associated with the storage service, the application or game may include a CAS value in the request. The API server 120 would receive the request and authenticate the CAS value (e.g., against a stored CAS value) and only send on application data, etc. to the storage services application server 204 if the CAS value is authenticated.

The CAS value will change after a successful update. The caller will need to obtain the new GAS value for all future transactions. The storage services application server 204 (or other application server(s) 122) may generate the new CAS value and return it to the API server 120. The API server 120 may replace the stored CAS value with the updated CAS value and send the updated CAS value to the client device 110 to be used in the next operation request.

There may be different authorization rules for authorizing an application identifier and a user identifier. For example, an application identifier for an application for which the operation will be acted upon and the application identifier derived from the application context should match to authorize the operation. As described above, this may be done by the API server 120 when the request for an operation associated with the storage service is received. As also described above, there may be some operations that require that the user identifier and target user identifier match.

There may be various storage types (e.g., binary large object or "blob") that the storage service provides. Some examples include a regular blob, an append blob, an increment blob, a private blob, and a private increment blob.

A regular blob may be created and deleted only by the owner, but non-owners can get and update data. An update operation on this blob may completely replace existing data with the new data. There is no restriction on the format of the data. There may be a maximum data amount that a regular blob can hold (e.g., 1 MB).

An append blob may be created and deleted only by the owner, but non-owners can get and append data. An append operation appends to existing data; it will not replace existing data. There is no restriction on the format of the data. There may be a maximum data amount that a regular blob can hold (e.g., 1 MB).

An increment blob can be created and deleted only by the owner, but non-owners can get and increment data. The value of an increment blob needs to be a non-negative integer. An increment operation applies an integer delta (positive or negative) to the current value. If the result of this operation is negative, the final value will be 0.

Only owners may create, get, update and delete a private blob. An update operation on this blob completely replaces existing data with the new data. There is no restriction on the format of the data. There may be a maximum data amount that a regular blob can hold (e.g., 1 MB).

Only owners can create, get; increment and delete a private increment blob. The value of a private increment blob needs to be a non-negative integer. An increment operation applies an integer delta (e.g., positive or negative) to the current value. If the result of this operation is negative, the final value will be 0.

Depending on a developer's application or game requirement, a developer may either use the regular or the private blob for saving game data. The only difference between the regular and private blob is in the access control (e.g., ACL). The ACL may include rules that dictate who can see/update a particular blob.

For a regular blob, a developer may use "create blob" to create a user blob. A developer may also use "update blob" as it creates a blob by default if one is not present. Update blob may also be used to modify contents of the blob. If a developer no longer needs the data, he may use "delete blob."

For a private blob, a developer may use "create private blob" to create a user blob. A developer may also use "update private blob" as it creates a blob by default if one is not present. Update private blob may be used to modify the contents of a blob. If the developer no longer needs the data, he may use "delete private blob."

Every create or update will give the developer a new CAS value for the blob. The developer may need the latest CAS value to perform an update. For multi-device games, two different clients may modify the contents of the same player. To check if the client has the latest CAS value, a developer may make use of get blob. Regular blob also supports getting single blob data for multiple users or getting multiple blob data for multiple users.

Various usage examples include a hash blob pattern, a summary blob pattern, a backup blob pattern, an inventor blob pattern, a wallet blob anti-pattern, etc. A common pattern for regular blobs, in order to improve performance, is the "hash blob" pattern. In this pattern a developer may create two separate blobs, for example, called "user" and "userHash". The "user" blob is the actual user data and the "userHash" is just a hash value of the "user" blob. The client is responsible for SETing both "user" and "userHash". A developer may GET the "userHash" blob and check if the hash value matches what was previously stored in the client, and thus avoid a GET on the (larger and more expensive) "user" blob. For client authoritative games, a developer may also add a key adtninEdit=(true/false) in the "userHash" blob. The Admin tool is responsible for setting this flag to "true" on an edit operation. The client may then make sure it downloads the "user" blob from the server and overrides its local copy.

Another usage example includes a summary blob pattern. Fetching another user's "user" blob may be expensive, as that blob is large. Also, it contains a lot of information that may not be needed, for example, for a neighbor bar or neighbor visit. In this pattern a developer may create two separate blobs, for example, called "user" and "userSummary." The "user" blob is all of the user's data, and the "userSummary" blob contains only the data that another player would need in order to render the neighbor bar. A developer may use a multi-GET API to fetch the userSummary blobs for the neighbors in order to render the neighbor bar. Again, the client is responsible for setting the "user" blob and the "userSummary" blob, whenever their contents change.

The backup blob pattern is to provide some security in the case of a catastrophic failure. For example, suppose it is discovered that a player has two blobs associated with their device (e.g., perhaps one from anonymous play and one from Facebook-connected play). Before deleting one of the two blobs forever, an app or the system may do a set to "user2" and keep a copy of what would otherwise get deleted from "user".

The private (or inventory) blob is meant to store data that the current player may access, but that other players should not see. For example, my inventory, or quest progress, or anything else that is not necessary to render a neighbor visit, might go into a private blob.

A last example is an anti-pattern wallet blob. Private blobs are still client authoritative, so it is not a good place to store, for example, premium currency balance. All blobs in the storage service may work this way, so a different service, such as a service that handles micro transactions for games (e.g., MECO, IAP API (In app purchases API), etc.), should be used for premium currency.

An append blob may be a good way to implement any message passing functionality in an application or game. When user A wants to send a message to user B, user A can append data to user B's append blob. A developer may use create append blob to create a user append blob. A developer may also use append to append blob as it creates an append blob by default if it is not present. A developer may append to the user data by using append to append blob. If a developer no longer needs the data, he can delete append blob. To pass a message to multiple users at once, the storage service supports append to single append blob for multiple users. The system 102 also supports getting single append blob data for multiple users and getting multiple append blob data for multiple users.

A JavaScript Object Notation (JSON) list pattern is a way to store a list of JSON objects in an append blob. For each JSON payload a developer may want to insert, the developer may add a ',' (comma) at the end of the JSON data every time he appends. To fetch the list of JSON objects, the client can do a GET on the append blob, remove the trailing ',' (comma), add '[' to the start and ']' to the end of the data, and then do a JSON decode. The resulting data will be a JSON list of the inserted JSON objects.

An append blob may be used in order to send messages from one player to another. For example, each player may have a single appendBlob called "inbox." To send a message to a player, an app may simply append to that player's append blob. These messages might contain anything that would modify the player's game state: "I sent you a gift", "I visited you and performed actions", etc. To receive an inbox, GET the append blob, process it, and then DELETE or SET it to empty, using CAS to ensure that the messages are not lost if the processing fails.

Another example pattern is viral limiters. All players may be able to GET an append blob. So, a sender may check to see if the recipient has any pending messages in their append blob (e.g., in their inbox), before sending a message. This may be useful to implement game rule limits on sending messages and helping other players. Suppose, for example, that only one neighbor is allowed to tend a particular user's farm each day. When a player attempts to tend someone else's farm, that player can fetch the "tendingFarm" append blob to see if any other neighbor has already performed this action. Presence of any data in the "tendingFarm" append blob may be sufficient to implement the rate limiting.

In one example embodiment, the server system 102 may provide a leaderboards service (e.g., via leaderboards application server 206) to maintain scores. Leaderboards may be a way to drive competition among players of a game both for the most hardcore fans (e.g., who will be fighting for the top spot in a public leaderboard) and for the more casual players (e.g., who will be interested in comparing their progress to their friends). The leaderboards service may offer simple, atomic REST APIs to update player scores against a global list, and to obtain lists to determine, for example, who the top N players are in the world for a given game in any measured dimension, who the players nearest a particular player are in ranking across the whole world for any given game in any measured dimension, how the player matches up against his friends in any measured dimension, how the player rates against other players in any skill-based competitive game, who the top players are during the last period (day, week, month, etc.), etc. A leaderboard service also provides a way for game teams to implement League of Legends and World of Warcraft style multi-tiered and multi-bucket leaderboards.

As described above for storage services, there may be different authorization rules for authorizing an application identifier and a user identifier. For example, an application identifier for an application for which the operation will be acted upon and the application identifier derived from the application context should match to authorize the operation. As described above, this may be done by the API server 120 when the request for an operation associated with the storage service is received. As also described above, there may be some operations that require that the user identifier and target user identifier match.

Leaderboards may be defined by game teams by including a LeaderboardName in requests. A LeaderboardName includes a reference to a template where the appropriate configuration is specified. There is no 'createLeaderboard' request; instead Leaderboards are auto-created when scores are stored using the Leaderboard name. A group of related leaderboards can reference the same template, simplifying configuration. Examples of leaderboards include: a single leaderboard for all users of a game, one leaderboard per country, a leaderboard for different game levels, etc. Players are assigned to leaderboards by the game based on game-specific attributes; performing a setScore for a player includes that player in a leaderboard.

Games can create permanent or periodic leaderboards. A permanent leaderboard is created once and exists for the life span of the game. A periodic leaderboard is created at the beginning of a period and is reset at the end of the period. During each period, player scores are collected and ranked. Only players who record scores within each period are included in that period's leaderboard.

There may be several time periods for periodic leaderboards. One example time period is daily, which starts at the time provided for 'period_start' in leaderboard settings. A new period may restart every one day from that time. An example format includes:

{ "data": { "daily.period_count": 1,
"daily.period_unit": "day" } }

Another example time period is weekly, which may start at the time provided for 'period_start' in leaderboard settings. A new period may restart every seven days from that time. An example format includes:

{ "data": { "weekly.period_count": 7,
"weekly.period_unit": "day" } }

Monthly is another example time period which may start at the time provided for 'period_start' in leaderboard settings. A new period may restart according to the calendar month. An example format includes:

{ "data": { "monthly.period_count": 1,
"monthly.period_unit": "month" } }

Games may perform setScore only for the current period, but may retrieve scores/rankings for any period.

The leaderboard service may provide periodic rollover notification. The leaderboard service may be configured to notify game code when a period rollover occurs using, for example, a 'rollover_webhook' setting. This webhook may identify a game-specific endpoint that is invoked on period rollover. This code may reside in either a game server or game code hosted on the GameServices Admin service.

Rollover processing can perform many operations, including player notifications using boombox campaigns or push-notif, awarding players in the top leaderboard positions, moving players to different tiers by modifying their user blobs, etc.

Rollover processing may occur without requiring that the player load the game. Rollover processing may utilize other API services such as the storage service to read/update user blobs. The rollover may be checked every hour, and the URL provided may include the http:// prefix. The information may be sent to the API server 120 JSON-encoded. The count may include the number of matching rollover periods that occurred since the last check, but it is limited to the retain period of the leaderboard. So, for short leaderboards with small retain periods, the count may not be all-inclusive.

Content may be in the following example format:

{ "count": NUMBER_OF_MATCHED_ROLLOVER,
"rollover_webhook":
"http://YOURENDPOINT.zynga.com:PORT/PATH",
"leaderboards": [ "MATCHING_TEMPLATE---MATCHING_MODIFIER" ], "template": "MATCHING_TEMPLATE",
"appId": "YOUR_APP_ID" }

The leaderboard service may also provide tiered leaderboards. Tiered Leaderboards may allow a game to assign users to tiers based on algorithms internal to the game. Some examples include Gold, Silver, Bronze, Diamond, Platinum, etc. Using a SetScore request, the game client assigns the user to a tier. Subsequent SetScore requests may move the player between tiers. However, an app_auth_set_tier template setting may be enabled to prevent tier changes through a SetScore API, Instead, a SetTier API (application auth only) must be used.

Within each tier the leaderboard service can be configured to separate players into fixed sized buckets. The leaderboard service assigns users to buckets within their tier, filling each bucket to its maximum size. The number of buckets for each tier is expanded based on the number of players within that tier.

The leaderboard service may provide a number of leaderboard operations. The basic operations may be to set a score on a leaderboard for a user and retrieve lists of users from a leaderboard based on search criteria. Example operations may include: setScore(appId, leaderboardName, id, score, extraData), incrementScore(appId, leaderboardName, id, incr), getScores(appId, leaderboardName, id, rank, before, after), deleteScore(appId, leaderboardName, id), etc.

The leaderboard service may provide support to access leaderboards. For example, a getScore API may support accessing players either by rank or by identifier. Rank ordering may return players within the same leaderboard bucket (e.g., either using absolute rank (top 10 players) or relative (10 players with rank surrounding the active player)). Accessing players by identifier may involve the game constructing a list of identifiers with a specific game or network association including, for example, friends, neighbors, guild members, and other in-game groupings.

Game code may construct a list of associated players for each user based on their relationships. Each user can have unique lists of associated players which may be specified as a list of identifiers. The leaderboard service is not involved in selecting players. Selecting players may be a game client responsibility.

Leaderboard configuration may include service configuration and template configuration. Service configuration may include service-wide configuration parameters, such as server_only_write (optional boolean) to allow updates (e.g., setScore) only from servers and disallow client writes.

As for template configuration, leaderboard configuration may be based on templates. A number of standard templates may be pre-defined; the game team may define additional templates as needed. A leaderboard name may consist of the following parts: <base-template-name>---<modifier-name>. The (base-template-name) may map to a leaderboard template, followed by three dashes ('---'), followed by modifier-name. Modifier-name may define a unique leaderboard. The '---' is not required, and if omitted, the leaderboard name must match a template.

When the initial SetScore is performed on a leaderboard, a template may be located based on the leaderboard name and a leaderboard may be automatically created. If a template cannot be found, the SetScore request fails.

The configuration for a leaderboard may contain the following (Usage: templateName.settingName):

period_count (optional int). The length of a period interval is period_units times period_count.

period_retain (optional int). This indicates the number of historical periods to retain. A GetScores request can retrieve this data using the period_offset parameter.

period_start (optional int). This is the starting timestamp for the first interval. The default may be "2012-01-01 08:00:00GMT."

period_unit (optional string). Periodic leaderboards may specify 'day' or 'month' to specify the length of their period intervals. The default value (infinite') creates a permanent leaderboard.

sort (optional string). This is used to sort order for the leaderboard by ascending (ASC) or descending (DSC). The default may be DSC. Descending means higher scores are better than lower scores, and ascending means the opposite.

tiers (optional string). This is the list of tier names and bucket size pairs. The string may contain tier-names (e.g., one or more tier name, separated by a comma), bucket-size (e.g., integer valued bucket size found at the end of the tier-names, separated by a colon), and tier-groups (e.g., sets of tier-name, bucket-size, separated by a semi-colon). For example, tiers may all have the same size tiers (e.g., tier1, tier2, tier3, tier4:1000), all tiers may have different sizes (e.g., tier1:1000; tier2:2000; tier3:3000; tier4:4000), tiers may be grouped by size tiers (e.g., tier1, tier2:1000; tier3, tier4:2000).

Active Windows (optional string). Leaderboards may specify a set of start and end offsets in seconds from the start of the period that specify windows for which the leaderboard is active within a period. Active Windows provide higher fidelity of control over when events should run for specific leaderboards. For instance, in a weekly, periodic leaderboard, an active window may be set to run an event only during the weekends, or only during weekdays, or any other configuration. Active Windows may follow the format: start:end,start:end. Start and end may be positive, integral offsets from the start of the period. To set an Active Window, updateSettings may be called with active_windows field included along with any other template settings following the same format. To unset Active Windows, updateSettings may be called again with active_windows set to an empty string " ". Active Windows are optional, and thus are not set by default. When set, Active Windows reject user-auth calls made outside of the window in a period. Active Windows are a feature for periodic leaderboards only and will not work for infinite leaderboards. Some examples include active_windows: 100:120 and active_windows: 100:120,1000:1200,4000:4200.

The system supports checking if currently in an active window in a period by calling getDataFromLeaderboard with the details parameter set to true. The call returns the information about the current period. For example, the call may return a start time (absolute value) that is the start time of the current period. This may be a mutable field. The call may return a period number (absolute value) which is the current period. Zero may be the first period. The call may return time left (delta) which is the time left until the end of the current period. The call may return is active (boolean) if active windows are set and it is an active window right now. The call may return in windows (array of absolute values) which is an array of windows that it is currently in, each expressed in the format {"start": 123, "end": 125}

An example response may include "end_time": 1412964513, "in_windows": [{"end": 1422878113, "start": 1412878113}, {"end": 1413001578, "start": 1412878113}, {"end": 1422878112, "start": 1412878113}], "is_active": true, "period_number": 0, "start_time": 1412878113, "time_left": 69838.

set_rule (optional string). Leaderboards may specify this optional setting: ifmax (which, if set, an update score call will only work if the new score is greater than the older score), and ifmin (which, if set, an update score call will only work if the new score is lower than the older score).

Additionally, app_auth_set_tier can be enabled to prevent tier changes through the SetScore API and allow tier changes to only occur through the SetTier API.

Example standard leaderboard templates are presented below:

{"data": {"daily.period_count": 1, "daily.period_retain": 3, "daily.period_start": 8674342, "daily.period_unit": "day", "daily.sort": "DSC", "daily.tiers": "tier1:infinite", "perm.period_retain": 1, "perm.period_start": 8674342, "perm.period_unit": "infinite", "daily.tiers": "tier1:infinite", "tiered.period_count": 1, "tiered.period_retain": 1, "tiered.period_start": 8674342, "tiered.period_unit": "infinite", "tiered.sort": "DSC", "tiered.tiers": "tier1,tier2,tier3,tier4:1000", "weekly.period_count": 7, "weekly.period_retain": 3, "weekly.period_start": 8674342, "weekly.period_unit": "day", "weekly.tiers": "tier1:infinite"}

As illustrated above, four standard templates are defined. A first is daily, which is a period leaderboard that resets at midnight. A second is perm, which is a permanent leaderboard that never expires. A third is tiered, which is a tiered leaderboard with four levels and 1000 players per bucket. A fourth is weekly, which is a periodic leaderboard that resets on Sunday morning at midnight.

Game teams may use get/set scores using leaderboard names in the following format:

Using the 'daily' standard template: 'daily' and 'daily≤northamerica', 'daily—southamerica', 'daily—europe', 'daily—asia', 'daily—africa', Using the 'weekly' standard template: 'weekly—lvl1', 'weekly—lvl2'

The majority of leaderboard template attributes may be immutable, and thus, once added, they cannot be modified. Some settings, such as active_windows and tiers, may be modified after they have been set.

Leaderboard services may further provide period_start, which is a mutable template parameter that may affect the calculation of period numbers for a periodic leaderboard. period_start modification on templates that have not started is a safe operation. On templates that have already started, modifying the period_start may cause the period number to jump forward or backwards depending on the period_count and period_unit. Implications of adjusting the period_start should be understood before making modifications.

If the period_start time is adjusted into the future, the period number could shift backwards, causing period numbers to be reused. Gets and sets would retrieve and set the data and keys that were used for the previous periods. This would occur on subsequent periods until a new period number is reached.

If the period_start time is adjusted into the past, the period number would shift forwards, causing period numbers to be fast-forwarded. The main caveat in moving period_start backwards is that any game logic that relies on looking into the previous periods might not work as expected as it is possible the previous period would have no data (and thus have a score of 0).

The leaderboard service may provide detailed usage reports for game teams. Two types of reports may be available: storage usage and request processing.

For storage usage, a reports API may be used to retrieve usage information for each application. This information may be refreshed once a day and may include the number of individual player scores stored, the amount of 'extra' space utilized, the total amount of space used, etc. The information may be available at the bucket level and may be summarized at the app, template, leaderboard and tier levels.

The reports API may return the app specific data in a JSON formatted form meant to be consumed by a reporting or analysis program. The JSON structure may contain the following levels: template, leaderboard, tier (default to '1' for non-tiered leaderboards), and bucket (default to '1' for non-bucketed leaderboards). At each level a 'cnt' field may indicate the number of scores stored at that level or below, and 'size' may indicate the amount of space used. At the top level '_players' may indicate the count of players whose 'extra' data fits into the different size ranges. In addition, appId=0 may return a summary across all appIds.

The leaderboard service may be accessed via API calls to API server 120. A developer may use standard leaderboard templates and may be used to create multiple leaderboards. A developer may also create custom leaderboard templates. A developer may use Set Score to set a score.

When setting or incrementing a score, extra data can be preserved for the associated identifier. There may be a few limitations regarding extra data. For example, extra data may be expected to be a string value (e.g., the service may respond with a failure otherwise), extra data may not exceed 2048 characters, and splunk may be used to monitor and review the sizes, allowing high-water mark alerts.

A sample JSON may look like: {"score": 10003, "id": 102, "extra": "102", "tier": 3}

To increment a score a developer may use Increment Score. An example JSON may look like: {"incr": 7}.

Scores may be returned using the following JSON formatted response:

```
{ "status_code": 0, "error_data": { }, "data":
{ "test-tiered": [ ( "score":
10004, "id": "103", "rank": 0,
"extra": "103" ), {
"score": 10003, "id": "102",
"rank": 1, "extra": "102" } ]
} }
```

A developer may get scores by rank. To get a score using rank, a developer may pass in the absolute rank as the focal point within the leaderboard and a before and after parameter. To get a score based on player, the developer may pass in the identifier of the player (e.g., user identifier) as the focal point within the leaderboard and a before and after parameter. The focal point within the leaderboard and the players 'n' entries before and 'm' entries after are returned.

To get a score from a list, a developer may pass in a list of identifiers to retrieve scores for specific players. Identifiers that do not have scores in this leaderboard are not included in the result.

In one example embodiment, the server system 102 may provide a trade service (e.g., via trade application server 208). The trade service provides a simple web API to support player-to-player item trading features in games. The service may be optimized for client-authoritative, invest/express (e.g., single player progression) style of games.

The fundamental resource in the trade service is an offer. An offer is a JSON hash containing a string name, an integer quantity, and an integer cost_per_each. Offers have a seller identifier (e.g., user identifier for the seller) and (when sold) a buyer identifier (e.g., user identifier for the buyer). An offer's status may be "available" or "sold". Users may create offers, view offers, buy offers (which marks the offer as sold) and delete offers. Users may also observe an offer, which will send notifications to that user when the offer is sold or deleted.

The trade service may also define a user resource. A user resource is keyed by a user identifier. The trade service maintains the set of offers the user is selling, and the set of offers they are observing. The trade service does not contain any other user information besides user identifiers and lists of offers (e.g., there is no user name).

Lastly, the trade service may define an application. Applications contain settings, which are key-value pairs. Application settings are mainly rate limits and price limits, plus a few other details.

The trade service may not modify a user's game state. Accordingly, when a user creates an offer for sale through the trade service, the game may be responsible to remove those items from the user's inventory. When an offer is purchased, the game may be responsible for transferring the items and currency.

To use the trade service, a developer's application or game will update settings from the build/deploy/release process. The developer may want to set trading rate limits and pricing at this time.

To sell goods within an application or game, a developer may use Create Offer to allow a user or player to create new offers. The developer may use Get User Offers to allow the user or player to check the status of the offer or Add Observing to allow the user or player to observe offers and receive real-time notifications when they sell.

Once the offers are sold, the user (e.g., the seller) may update their game state, and then call Delete Offer or Delete Offers Per User to remove their offers. The seller can call these methods whether or not the offers have sold.

The trade service supports the notion of offers automatically being purchased after some timeout. This is meant to provide users with the experience of offers selling, even if there are not any buyers. To enable this, a developer may either call Autobuy or set the autobuy setting during Create Offer.

To buy goods within an application or a game, users can browse offers using Get Random Offers or Get User Offers. While browsing offers, a developer may use Add Observing to allow a user to see real-time updates if those offers are purchased by other users. Users buy offers with Buy. At this point, the user (e.g., the buyer) is responsible for updating their own game state to complete the purchase (e.g., removing coins, and adding the purchased items to inventory).

The trade service was designed for users to offer items for currency. However, it can also be used "in reverse," where users offer currency for items. For example, the game Farmville 3 may use this idea to implement a "job board." When an offer is purchased through the job board, the buyer removes the items and receives coins, and the seller gets the items and spends coins. Because the trade service does not update user inventory or currency, the usage of the trade service is identical. Users offering jobs do so by creating offers, and users fulfilling jobs "buy" the offers.

In one example embodiment, the server system 102 may provide a guilds or alliances service (e.g., via storage application server 204). The guilds service may support functionality needed to manage core aspects of a Guild, Clan, or Group of users.

If a developer is looking to implement a "group play" feature in his game whereby players assist one another or contribute to a common goal in the interest of enhancing their gaming experience or furthering their progress in the game, the developer may use the guilds service to develop the mechanics for group play. Some example games that may utilize the guild service include the co-op feature in FarmVille 2 Country Escape, the co-op feature in FarmVille 2, the alliance feature in CastleVille, the Clan feature in Ninja Kingdom, Ayakashi, and War of the Fallen.

A guild is a collection of players. Any player may join a guild. Players belonging to a guild may be known as members of the guild. Each game may define how many members are allowed in a guild.

Every guild may have one or more members who are also leaders of the guild. The leader of a guild may be responsible for inviting new members or accepting requests from players wishing to join.

All guilds may have a core set of intrinsic attributes such as a Name, Description and Level. Both guilds and players may have game-defined resources in the form of meta and currencies. Meta may be game-controlled JSON blobs. Currencies may be integers that measure wealth. Read/write rules may be defined for meta and currencies.

Players can discover guilds to join by using a Guilds search feature. A number of different parameters may be used to construct reasonably sophisticated search queries. The following sections explore these concepts, and others, in greater detail.

A guild is an entity that contains players (e.g., known as members) and maintains a set of resources. One or more members is also a leader of the guild. A guild is uniquely identified by a guild identifier (e.g., guildId). A guild's guildId is automatically assigned when a guild is created. It is unique system-wide.

Each player within a guild is a member of that guild. A player can only be a member of one guild at a time. Players join a guild through an invitation system. Players may be invited to join a guild or they may request membership themselves. A player may leave a guild of their own volition or they can be forcibly removed from a guild by the guild leader. Players may also be banned from the guilds system.

Every guild has at least one member who is also the leader of the guild. The guild leader has the power to invite players into the guild, remove players from the guild, or promote other members in the guild to leader. A member may become a leader in several ways. For example, a player who creates a guild will initially be the only guild member and will automatically be promoted to leader. In another example, a member can be promoted to leader by another leader. In yet another example, if all leaders leave a guild, the most veteran member (e.g., the member that has been with the guild the longest) may be automatically promoted to leader.

Every guild may have three resources, including attributes, meta, and currencies. Attributes are intrinsic to all guilds across all games. Attributes may contain a name of the guild, a description of the guild, and a level. The level may be a number indicating the level of the guild. A guild's level (e.g., coupled with addionalMaxMembers defined in the Application Config) may dictate how many members a guild can have. A guild's level must be greater than or equal to 0 and defaults to 1. Attributes may further contain additional maximum members which may be a number indicating how many additional members a guild can have beyond the maximum (e.g., defined by addionalMaxMembers in the Application Config) at the guild's current level.

Attributes may also contain last updated, which may be a Unix timestamp indicating the last time a guild's attributes, meta, currencies or list of members was updated. Attributes may contain active, which is a true/false value indicating if the guild is in use. A guild with no members is considered inactive and this value is automatically set to false. A guild cannot be reactivated once inactive. Attributes may further contain a member count to indicate the number of members belonging to a guild, and an invite status (e.g., open, closed, secret) which determines the way in which members can join this guild. Meta and Currencies are game-defined and common to all guilds. They are not intrinsic.

A player is an entity that maintains a relationship with zero or more guilds and maintains a set of resources. A player is uniquely identified by a user identifier or player identifier (e.g., playerId). A player's playerId is set by the game when the player entity is initially created. A game may use any scheme they wish for setting playerIds, but the playerId must be unique within the game. A player entity may be created only when they request to join a guild, or are invited to join a guild. Until those actions are performed, any other actions performed on a player will not succeed because that player does not yet exist according to guilds.

A player may have a relationship with zero or more guilds. They may either be a member of a guild or have been invited/requested to join a guild (e.g., a pending member). A player may only be a member of at most one guild at a time, but may be a pending member of any number of guilds.

Relationships may be managed through a set of roles defined in a Player-Guild entity. A Player-Guild entity may exist for each relationship a player has with a guild. These entities are ephemeral and may only exist for as long as a player maintains a relationship with a guild.

Every player has three resources, including attributes, meta, and currencies. All resources may be game-defined and common to all players. A player may maintain a separate set of resources in a Player-Guild entity for each relationship they have with a guild. If a player's relationship with a guild ceases to exist, the resources associated with that relationship will cease to exist as well. However, the player may still retain their own resources.

An application configuration is a game-specific entity that controls how guilds are structured and how they function. It may control the structure of guild, player, and player-guild resources and associated read/write rules. It may optionally control profanity filtering, unique guild names, and guild members' ability to invite players. It may also control a maximum number of guild members per guild level.

The application configuration may be a structured. JSON blob. It must be created before a game can interact with the Guilds service, but rarely needs to be updated thereafter. It may be structured as such:

{ "version": ..., "administrativeRank": ...,
"maxMembersPerLevel": { ... }, "guildRules": { ... },
"userRules": { ... }, "userGuildRules": { ... },
"requireUniqueGuildNames": ..., "requireProfanityFiltering": ...,
"memberAllowedToInviteAccept": ...,
"memberAllowedToCancelDecline": ..., "appId": .... }

There may be three properties that control resource structure and read/write rules: guildRules, userGuildRules, and userRules. These control the structure and read/write rules of the attributes, meta, and currencies belonging to Guilds, Players and Player-Guild relationships. For example, a Guild's meta value called 'foo':

```
{ ... "guildRules": { "attributes" : { ... }
"meta": { "foo": { "actions": { "write": {
"roles": [ "SYSTEM" ] },
"read": { "roles": [ "SYSTEM",
"USER" ] } }, "limits": { },
"settings": { }, "defaultValue": null }, },
"currencies" : { ... } }, "userGuildRules" : { ... },
"userRules" : { ... } ... }
```

If a resource is not listed in the appropriate rules section, it may not be read or updated. For example, if guildRules.meta.foo is not defined, any attempts to update that value will fail.

Profanity filtering can be optionally enabled to prevent guild names or descriptions from containing profane words. Profanity filtering may be supported for a number of languages including, for example, Arabic, Chinese, Danish, Dutch, English, French, German, Indonesian, Italian, Japanese, Korean, Malay, Norwegian, Polish, Portuguese, Russian, Spanish, Swedish, Thai, and Turkish. Guild names and descriptions may be checked against a list of 'bad' words for all languages by default. For example, if a guild has a description in English, it will be examined to determine if it contains profane words from any of the above languages.

Locale information may be optionally provided to relax profanity filtering. This may be done by providing a comma-separated list of 2-letter ISO 639-1 locales using a 'locales' query parameter. This may be done for any calls that update a guild's name or description. Any word that is considered profane in any of the above languages may be checked against a list of 'good' words for the languages listed in the 'locale' query parameter. If it is considered a 'good' word in one of the provided languages, it will be allowed. Supplying locale information helps handle cases where a word is considered profane in one language, but not profane in another. For example, 'fan' is profane in Swedish but not English. Providing the 'en' locale will allow it to be used in names or descriptions; otherwise, it will be forbidden.

Unique guild names may be optionally enforced. Enabling this feature may prevent newly created or existing guilds from setting their guild name to a name that is already used by another guild.

Normally only guild leaders are allowed to invite players into a guild. This privilege may be optionally extended to regular members of a guild.

The maximum number of members that a guild is allowed to have may be restricted based on the guild's level. For example, a guild's members may be restricted based on level up until level 50: "maxMembersPerLevel": {"1": 3, "10": 5, "20": 10, "50": 20}

The maximum number of members allowed may be based on the nearest value less than or equal to the guild's current level. For instance, in the above example, a level 48 guild may only be allowed to have ten members.

Attributes are intrinsic values associated with an entity. That is, every entity of the same type may have these attributes across all games. For example, guilds may have intrinsic attributes such as a name, description, level, etc.

Meta may be a JSON object that belongs to an entity. It may consist of an unordered collection of key/value pairs defined by the game. Each key in the meta blob may store any JSON type, including nested JSON objects. Meta may be defined for guilds, players, and player-guild relationships.

Each meta field containing a nested JSON object may be considered a 'meta group'. Meta groups, as well as keys within a meta group, may be read and written individually without needing to update the entire meta blob. Any substructure of a meta group may be read. Using meta groups may be an effective way of avoiding race conditions (e.g., performing two or more operations at the same time in the improper sequence) caused by concurrent updates to meta. Game teams may use meta for tracking additional information about players and guilds. Meta may have game-defined read/write permissions which may be specified in the application configuration. Once a meta field stores a certain type of data, it must always store the same type. For example, if it initially stores numbers, it cannot store strings in the future. However, if a meta field stores a JSON object, the object's field types and structure may be changed.

Currencies are integer values representing an entity's wealth. Currencies may be defined for guilds, players, and player-guild relationships. For example, a guild could have two currencies, 'honor' and 'gold', the meaning of which is left up to the game to define. Currencies are different than Meta values since they can only be integers. This type restriction allows currencies to provide additional functionality such as transactions and rollups. Currencies have game defined read/write permissions which are specified in the application configuration.

Transactions may allow currencies to be updated by providing a delta value (e.g. the change in value +/−) for the currency. This allows currencies to be atomically incremented or decremented without needing to know their present value. It is a race-safe way to update currencies.

Rollups are a mechanism that may allow currencies belonging to guild members to be added together and stored as a guild currency of the same type. For example, if a guild has three members and each member has one 'gold' each, the guild to which they belong will have three 'gold'. If a player's currency changes, the change will be automatically reflected in the guild's currency. It is a useful way to reflect the total wealth of all guild members in the wealth of the guild.

Rollups may operate on currencies belonging to a player, or currencies belonging to a player-guild relationship. If a rollup is defined on a player's currency, and that player leaves the guild, their currency contribution will be decremented from the guild but they will retain their currency. If a rollup is defined on a player's relationship with a guild, and that player leaves a guild, their currency will be decremented from the guild and will not be preserved or retained by the player. A guild currency that has rollups applied to it cannot be updated directly or have transactions applied to it. Its value may only be set through the rollup of guild member's currencies.

Each player may have one or more roles for each guild they maintain a relationship with. Roles may serve to control access rights to guild, player, and player-guild resources and to identify how a player relates to a given guild. There may be many roles used by guilds. For example, a member may be a current member of the target guild, a leader may be an administrator of the guild, and an owner may be an artifact a game may assign, or transfer, to indicate a level above leader. An owner role is transferable. Some games may use it as a label to indicate a super-leader. It may not grant any permissions within the service.

Some other examples of roles include creator, which may be an artifact indicating the original creator of the guild. This role may be non-transferable and does not grant any permissions within the service. An invitee may indicate that a player has been invited to join a guild and a requester indicates that a player has requested to join a guild. A user may be any authenticated user/player. All players may implicitly have a "self" role which is useful when describing permissions on an individual player's meta or currencies. A system role may be an application context call, or the effect of an internal change (such as the last member of a guild leaving). Roles may be stored in player-guild relationships and not the player entity itself.

Players join guilds by either requesting to join a guild or being invited to join a guild by the guild's leader. The approach a player must use depends on the guild's invite Status attribute (e.g., open/closed/secret). An open attribute may indicate that the player will automatically become a member of a guild if they request to join. Alternatively, a guild leader may also send an invitation but the player must accept the invitation to join. A closed attribute may indicate that players must send a request to join the guild, but will not automatically become members of the guild. The request must be approved by the guild leader in order for the player to join the guild. Alternatively, a guild leader can send an invitation but the player must accept the invitation to join. A secret attribute may indicate that the guild leader must send an invitation to a player and that the player must accept the invitation to join the guild. Secret guilds are not searchable.

After a request or an invitation has been made, a player may be assigned the INVITEE or REQUESTER role appropriately. The player may be added to a guild's 'pending' membership list. This list may contain all players that have either requested to join a guild, or that have been invited but have not yet joined, or had their request cancelled or cancelled their invitation. Once a player joins a guild, they are assigned the MEMBER role and will have the INVITEE or REQUESTER role removed. A player may retain all outstanding INVITEE and REQUESTER roles for other guilds even after joining another guild. If the player leaves their guild at a later date, they can still accept any outstanding invitations. For example, an invitation to join a guild, or a request to join, may still be active until it is either declined or cancelled The guilds service provides a search feature that may allow guilds to be discovered. The search feature may be utilized to find guilds for players to join. Searches can be performed using a number of different search parameters. Some example search parameters may include text search (e.g., a search for any guild attributes or meta values containing this); offset/limit, used for paging search results; custom fields, which allow searching for guilds with specific attributes, meta, or currency values; custom ranges, which allow searching for guilds with specific attributes, meta, or currency values within certain ranges; sort fields, which allow sorting for results based on the values of attributes, meta; or currencies. Results can be sorted on multiple fields at once. Full guild data or partial data can be returned from a search query.

All aspects of a guild, except its members, may be searchable. Some examples of searches include the number of members within a certain range, a meta value containing a specific value, a currency above a certain value, a guild whose name starts with "Farm," etc. Secret guilds will not be returned in search results. Data returned from a Guilds search may be out of date by at most one minute. For example, a newly created guild may not show up in search results until at most one minute after its creation. Meta fields are not searchable by default.

Different games may use Guilds in different ways. The way a game is architected will dictate how it ought to interact with the Guilds service. All requests made to Guilds from external sources (e.g., machines outside the datacenter) may make requests over HTTPS. These include mobile game clients and Flash. This will ensure that data is sent and received without unwanted interference from malicious third parties. All requests made to Guilds from internal sources (e.g., machines inside the datacenter), in this example embodiment, may be made over HTTP. Since data sent within the datacenter is not at risk, hops is not necessary, and using http requires fewer system resources.

The Guilds Service API responses may be valid JSON and use standard HTTP response codes. For example, the responses may use 200 codes for successful responses, 400 codes for user errors, and 500 codes for internal errors.

Guilds may use a single standard JSON response body structure for all responses, except for framework exceptions. An example includes:

{ status: <status>, code: <code> message:
<message> data: <object> }

The status field may be one of the values including success, fail, and error. These map to the HTTP status codes, 2xx, 4xx, and 5xx. A string constant may explain the reasons for the status code. A verbose message may assist with debugging failed calls. Data contains the result of the call upon success.

The guilds service provides a lot of functionality and flexibility for games to build different group-play features on top of existing core Guilds features. The following sections give an overview of some common usages of the system.

A developer may register an application configuration to use the Guilds service. For example, a developer may make an API call to a config end point to add or update their guild configuration. The guild configuration per app may be a JSON object that holds details on the usage of the guilds service by the app. After registering, the application configuration may only need to be updated if new attributes/meta/currencies are needed, if their access permissions need to be changed, or if different Guilds functionality needs to be enabled. The application configuration should not be updated programmatically. Once the application configuration has been registered, the game may create at least one guild. This guild may have as many planned meta and currency values as possible set. This may be necessary to ensure that the Guild's Finder index is properly initialized for the game.

A guild may be created through Create Guild. Some initial attributes may be needed to create a guild such as, for example, a guild's name, a description of the guild, and the user identifier (e.g., playerId) of the user or player creating the guild. This player will become the guild's leader. Some optional attributes that may be set when creating a guild include inviteStatus, additionalmaxmembers, level, and meta. When a developer or application/game sends the data to create a guild (e.g., via a client device 110) the server system 102 may send a response with the current structure of the created guild and a guild identifier (e.g., guildId).

Another feature of the guilds service is enabling users to group themselves into guilds. There may be two ways a player may become a member of a guild. One is when a player is invited to join a guild; another is when a player requests to join a guild.

The guilds service provides a set of endpoints to facilitate either of the above request flows. A guild must first be created, and have at least one leader, before other players can join it.

Inviting a player to a guild is accomplished using the invite endpoint on a player resource. The process comprises sending an invite to a player and then receiving an accept or decline from the player. A guild may also cancel an invite after it has been sent.

An invite is an indication that a guild would like a player to become a member of that guild. An invite is sent to a player by a guild leader, a guild member with sufficient permissions (memberAllowedToInviteAccept=true in application config), or by the system via an app-context request. Once a successful invite has been made, the player's player-guild relationship will receive the INVITEE role. Players cannot invite themselves to a guild. Players cannot be invited into a guild that does not exist.

An invite can be sent to a player that is already a member of an existing guild. However, a player may need to leave their current guild before they can accept an invite to join a different guild. If a guild sends an invite to a player that has already requested to join the guild, the player may be automatically added as a member. This only applies to guilds with CLOSED invite status.

Players join a guild by accepting an invite sent by that guild. Players can also decline an invite sent by a guild. If an invite is accepted, the player's player-guild relationship will receive the MEMBER role and will have the INVITEE role removed. If an invite is declined, the player's player-guild relationship will have the INIVTEE roles removed.

A guild may cancel an invite at any time so long as the player being invited has not accepted or declined the invite. The invite may be cancelled by a guild leader, guild member with sufficient permission (memberAllowedToCancelDecline=true in application config), or by the system via an app-context request.

Requesting to join a guild is accomplished by using the request endpoint on a guild resource. The process may comprise sending a request to the guild and receiving an accept or decline from the guild. A player may also cancel a request after it has been sent.

A request is an indication that a player would like to become a member of a guild. A request is sent to a guild by a player or by the system via an app-context request. The effect of sending a request depends on a guild's invite status attribute. For example, with an OPEN status attribute, the requesting player may be automatically added to the guild as a member. With a CLOSED status attribute, the requesting player may be added to the guild depending on whether the guild accepts or declines their request. For a SECRET status attribute, the requesting player cannot request to join a secret guild; rather, they must be invited to join a secret guild to become a member. Once a successful request has been made, the player's player-guild relationship will receive the REQUESTER role. Players cannot request to join guilds that do not exist.

A player can request to join multiple guilds while they are not a member of any guild. However, once a player joins a guild, they cannot request to join other guilds. They must leave their current guild before they can request to join other guilds. If a player requests to join a guild that has already sent them an invite, they may be automatically added as a member of the guild. This only applies to guilds with OPEN or CLOSED invite status.

A requesting player may become a member of a guild if that guild accepts their request. The guild may also decline their request. The request may be accepted/declined by a guild leader, guild member with sufficient permission (memberAllowedToInviteAccept/memberAllowedToCancelDecline=true in application config), or by the system via an app-context request. If a request is accepted, the player's player-guild relationship may receive the MEMBER role and may have the REQUESTER role removed. If a request is declined, the player's player-guild relationship will have the REQUESTER role removed. A player may cancel a request at any time so long as the guild they are requesting to join has not accepted or declined their request.

Invites and requests can be fetched from the invite and request resources on both a player and guild resource. An application may request to get all the invites sent to a guild, for which the server system 102 will return a list of all user identifiers (e.g., playerIds) of players to whom the guild has sent invites. An application may request to get all invites sent by a player, for which the server system 102 will return a list of all guild identifiers (e.g., guildIds) of guilds that the player has been invited to join.

An application may request to get all requests sent to a guild, for which the server system 102 may return a list of all user identifiers (e.g., playerIds) of players that have requested to join the guild. The application may request to get all requests sent by a player, for which the server system 102 may return a list of all guild identifiers (e.g., guildIds) of guilds that a player has requested to join.

Players may join a guild using a pending endpoint. Sending an invitation, requesting to join, accepting an invitation, and approving a request may all be done though the same endpoint. The meaning of calls to the pending endpoint (whether an invite/request or accept/approve) may be controlled by the user identifier (e.g., player-id) header sent with the request and the user identifier (e.g, playerId) specified in the URL path.

The player-id header specifies the 'principal' player (e.g., the player that is making the request). The playerId in the URL path specifies the 'target' player (e.g., the player that a call is being made against). Below are a few examples that illustrate how this works.

To send an invitation to join a guild, the principal player must be the guild leader and the target player must be the player that is being invited. This action means the guild leader is making a pending request against a player. Since the player has not requested to join yet, it implicitly means that the guild leader intends for the player to join the guild. The guild leader sends an invitation.

To send a request to join a guild, the principal player must be the player intending to join and the target player must also be the player intending to join. This action means that the player is making a pending request against themselves. Since they have not been invited yet, it implicitly means that they intend for themselves to join the guild. The player requests to join.

To accept an invitation, the principal player must be the player intending to join and the target player must also be the player intending to join. This action means that the player is making a pending request against themselves. Since they have already been invited, it implicitly means that they intend to accept the invitation to join the guild. The player accepts the invitation.

To approve a request to join, the principal player must be the guild leader and the target player must be the player that is being invited. This action means that the guild leader is making a pending request against a player. Since the player has requested to join, it implicitly means that the guild leader approves their intent to join the guild. The guild leader accepts the request to join.

There may be two example endpoints that may be used to view a guild's data. One may be a basic guild structure containing only a guild's attributes, meta, and currencies. A second may be a full guild structure containing a guild's attributes, meta, currencies, and members. It may also be possible to fetch guild attributes, meta and currencies separately instead of fetching the entire guild object.

Guild resources may all be updated. Attributes may be updated individually or multiple attribute may be updated at once. Meta fields may be updated individually or multiple fields can be updated at once. Fields may also be updated at the root level, or updated at the meta group level. Currencies may be updated individually or multiple currencies can be updated at once. Currencies may be explicitly updated to a specific value, or incrementally updated through transactions.

A player may be removed from a guild by choosing to leave or by being removed from the guild. Both operations may be accomplished through the remove player endpoint. The meaning of calls to the remove player endpoint (whether a player leaves voluntarily or is removed) is controlled by the 'player-id' header sent with the request to determine who is making the request. If the player-id header contains the same playerId as in the URI, path, that member is choosing to leave the guild. If the player-id header contains that of the guild leader, then the guild-leader is evicting whichever player is specified in the URL path. When a player is removed from a guild, all of the player's data associated with the guild is lost. That is, the player-guild relationship (and all the relationship's resources) is deleted. The player is now free to join another guild.

A guild may be deleted by explicitly deleting it through a delete guild endpoint or when all members leave the guild. Once a guild is deleted, it will no longer show up in search results and no new members can join it. It cannot be reactive.

Meta is an arbitrary JSON blob. This allows game teams to define and store any data they wish. Meta may exist at three levels. A first level may be a guild level where data exists within a guild and will be lost if a guild is deleted. A second level may be a player level, where data belongs to a player and will persist with the player even as they move between guilds. A third may be a player-guild level, where data belongs to a player as long as they maintain a relationship with a guild. If they leave that guild, the data will be lost. All meta fields at all levels may first be defined in the game's application configuration before they can be used.

Some example usages of meta include customized guilds. For example, a game may add a flavor on top of Open/Closed. Guilds, wherein the guild creators define minimum achievements/scores a player needs to have to be in their guild. In the specific mechanic, the game may decide to use the score (which may be directly related to the activity in the game) as an achievement which is stored in meta at the guild level. A player is only allowed to make a request if his score is greater than the minimum criteria set by the creator. The score is customizable by the creator. This allows guild creators to only form guilds with players of similar activity. As a part of customization, the game may also store "symbolColor" and "symbolIcon" as a meta at the guild level, which helps players customize their guilds.

A game may also use meta to define goals for a guild. Typically, a guild needs to accomplish multiple goals in a limited time to receive certain rewards. This drives guild members towards a common task, as all members are rewarded upon successful completion of the goals. The dynamic nature of the meta fields allows the game to track more detailed information such as timestamp for different goals, reward amount, etc.

A game may also use meta groups to store additional information about guild members in its guild's meta blob. This may allow a game to fetch all member data in a single call, while also allowing the game to update an individual member's data without updates conflicting with each other. For example, a game may create a guild-level meta key called "membersData:"

{ . . . "membersData":{"playerId1":{"stars": 5, "knights": 2}, "playerId2":{"stars": 10, "knights": 0}}}

To update an individual player's data, the game may use an update meta group to send a value like:

{"playerId1":{"star": 5, "knights": 2}}

If the game happened to send an update to 'playerId2' at the same time, it would not overwrite the update to 'playerId1'.

Currency is a measure of an entity's wealth. Each entity may have multiple currencies. They may all be integers and greater than or equal to 0. Currency may exist at three levels. For a guild level, the data belongs to a guild and will be lost if a guild is deleted. For a player level, the data belongs to a player and will persist with the player even as they move between guilds. For a player-guild level, the data belongs to a player as long as they maintain a relationship with a guild. If they leave that guild, the data will be lost. Currencies may be updated to a particular value, or they may be incrementally updated using transactions. A currency defined at the guild level may also be passively updated through rollups defined on its member's currencies.

Transactions have many advantages. For example, transactions are atomic—they are a race-safe way to update values where maintaining the correct amount is critically important. Also, transactions do not require knowing the current value of a currency. The only thing that needs to be known is how much a currency should change. Moreover, multiple currencies may be updated at once, and the same currency may be updated multiple times in the same call. This allows batching of operations to reduce the number of network calls. Furthermore, all transactions are recorded and can be recovered for auditing purposes later.

A transaction may be performed by sending the currency delta (e.g., the change in value). A currency may either change positively (e.g., increment) or negatively (e.g., decrement). If a currency is decremented, it cannot go below 0. All transactions may be sent via the currency transaction endpoint.

Transactions may be sent using the following request body:

[{"name": " . . . name of currency . . . ", "amount": . . . amount currency will change by, must be positive or negative integer . . . , "description": " . . . a description of this transactions . . . "}, . . . ]

The response format of a successful transaction may be:

"objects":[ { "id": ...,
"location":"/guilds/v2/app/.../guild/.../currencies/transaction/...
", "object":[ { "version":1,
"targetScope":...which entity transaction was for Guild/Player ...,
"targetPlayerId":null, "targetGuildId":null,

```
"transactionDate": ...time of transaction in UTC microseconds...,
"name": ...currency affected..., "amount": ...transaction
amount..., "comment": ...comment...,
"applied":true, "resultingBalance": ...balance of currency
after transaction was applied..., "transactionId":
...unique transaction id, used to lookup transaction later...
}, ... object for each transaction sent ... ] } ]
```

Transactions are recorded and can be recovered for auditing purposes later using the transaction lookup endpoint. An application may supply a transaction identifier (e.g., transactionId) to look up a previous transaction.

Rollups allows the sum of all member's currency to be stored as a currency of the same name in the guild. Rollups are set up in the application configuration in either the userRules or userGuildRules section. A currency of the same name must also be set up in the guildRules section. For example, the definitions for a currency called 'coins' that is rolled up from members to their guild may look like:

```
"guildRules": { "currencies": { "coins": {
"actions": { "write": { "roles": [
"SYSTEM" ] }, "read": {
"roles": [ "SYSTEM", "USER" ]
} }, "limits ": { }, "settings": { },
"defaultValue": null }, ... "userRules": { "currencies": {
"stars": { "actions": { "write": { "roles":
[ "SYSTEM" ] }, "read": {
"roles": [ "SYSTEM", "USER" ]
} }, "limits": { }, "settings": {
"rollUp": "SUM" }, "defaultValue": null },
```

This will sum the player currency 'coins' for all members of the guild and store the value in the guild currency 'coins'.

As an example, a game may use 'xp' as a currency at the guild level. The 'xp' currency may allow a guild to level-up in the game, just as 'Experience points' may allow a player to level up. Leveling up a Guild may unlock interesting game features. For example, currencies used by a game may look like:

```
{ "currencies": { "honor": 2, "GoldStorage1":
0, "WallSections3": 0, "WallSections2": 0, "xp": 12,
"WallSections1": 10000, "BigBomb1.": 0, "WallSections6": 0,
"WallSections5": 0, "WallSections4": 0, "Defense1" : 0,
"Bomb1": 0, "Defense2": 0, "SushiStorage1": 0,
"Decoration1": 0 } }
```

The Guilds service provides the ability to search for guilds belonging to the same game. There are a number of parameters that can be used to refine search results to contain the most relevant guilds. Searching may be done through a search endpoint. Various parameters may be used to refine searches. A search parameter may be a search term, or query string using the Lucene query language. A result format may be the format in which guilds are returned. If left blank, it may default to GUILD. A GUILD parameter may return guild data only. A MEMBERS parameter may return member data only (e.g., playerIds of guild members). A FULL parameter may return both guild data and guild members data. An offset parameter may start position of returned results out of entire result set. This may be used for paginating results. A limit parameter may return a maximum number of results (e.g., default 25). A customer fields parameter may return a list of fields and the terms their values should match. A custom ranges parameter may return a list of fields and the ranges that their values must be within. A sort fields parameter may return a list of fields that the result should be sorted by (default_score). A flags parameter may return a list of flags to refine search results. A notfull parameter may return guilds that currently are not at their maximum member capacity. An escape parameter may be used to escape special characters in the search field. The default may be false.

Guilds may not allow searching on meta fields by default. Meta fields may be made searchable by adding a custom mapping to Finder that includes the meta fields to be searched. A custom mapping may need to be added for each application identifier (e.g., appId) that intends to search the given meta fields.

Batch calls may be made with the system. Guilds services may have various endpoints that may be used to return multiple guild identifiers (e.g., guildIds) given a list of guildIds. The guild data that may be fetched using the batch endpoints may include members belonging to each guild, meta for each guild, and full guild data including all resources and members. Fetching data for multiple guilds using the batch endpoints greatly reduces the number of network calls that need to be made to Guilds. This can be useful for game clients, which may suffer from high network latency and wish to make as few network calls as possible. Batch data may be fetched for a maximum guilds (e.g., 50).

The guild leader is able to ban members from a guild. Once a member is banned, they will no longer be a member of the guild and will be forbidden from requesting to join the guild again. This is accomplished through a ban endpoint. A ban can be removed as well through an unban endpoint There are a number of administrative actions that can be performed on behalf of the game. That is, no particular player is performing any of these actions, but rather the game has chosen to intervene. This may be necessary if a player is cheating or violating a game's usage policy in some way and needs to be dealt with. These actions may be made using app-auth.

Sometimes it may be necessary to ban a player from interacting with any guilds. A system-wide ban may be accomplished through a system ban endpoint. Any player banned from Guilds will be unable to create guilds or join guilds. It is possible to remove this ban with the system unban endpoint.

A player may be removed from a guild by the game. This may be accomplished through a remove player endpoint.

Additional game feature support may include advertising a guild using a game's premium currency. For example, a game may want to implement a game mechanic wherein the creator of a guild may advertise his guild for 24 hours on payment of some number of premium game currency. For this feature, the game stores the expected advertisement end timestamp in the meta field of the guild, which provides easy lookup to turn off advertisement.

Another additional game system may include conversation. When users send requests to the guild, a game may store a Conversation channel, which the player is subscribed to in an array on the guild, and which enables them to send real-time (or substantially real-time) updates to the user about their guild status. Storing this data on the guild blob itself provides easy lookup. A meta blob for a guild in a game may look like:

```
{ "meta": { "symbolColor": "guild_color_02",
"symbolIcon": "guild_symbol_07", "minHonor": 100, //
```

-continued

```
Minimum Mojo "advertisingEndTime": 1378228170, //Advertising
end time "guildGoals": { // Guild Goals
"WallSections6": { "completed": 1, "timestamp":
1378228100 }, "Defense1": { "completed": 0,
"timestamp": 0 }, "GoldStorage1": {
"completed": 1, "timestamp": 1378228170 } }
```

In one example embodiment, the server system 102 may provide an auction service (e.g., via auction application server 214). The auction service may provide a way to buy and sell in-game items. For example, it may allow players to post items for auction and to bid on items others have posted. Some example application or game scenarios may include creating content auctions created by, players or by a game, creating an auction house within a game, converting goods to coins or coins to goods on an open market, creating rolling auctions.

One example use case is for sports. Sports teams are made of players. In the real world, some players are better than others. All players get hurt or improve as a result of playing. As a result, there is a need to acquire new players over time to improve your team or replace injured players. The auction service may provide a mechanism for purchase and trade. The game can always inspect and generate new players to keep the content quality interesting for all levels of play.

Another example use case is mid-core. Many mid-core genre games involve some mechanism of battle, where troops and other armaments are exhausted. Prior to battle, there may be the desire to purchase mercenaries to bolster an army. The auction service may be used as a mercenary clearing house, where players post and bid on mercenaries. The game can always inspect and generate troops (especially unique troops) to keep the content quality interesting for all levels of play.

To use the auction service, application or games may be required to adhere to authorization rules depending on application or user authentication context. Each API may have a different authorization rule and each API may support more than one authorization rule.

Authorization may be largely driven by an Authorization Header, which may be in the following format: Authorization: nat|<networkID>|<ZyngaAppId>|<NetworkToken>

The auction service may include authorization rules for application authorization and user authorization. For application authorization, the application identifier to be acted upon and the application identifier derived from the application context should match. For user authorization, there may be a self rule and an open rule. For the self rule, the user identifier may be the identifier derived from the authorization header. The user identifier and the target user identifier must match (as explained above with respect to other services provided). For the open rule, the user identifier and the target user identifier need not match (as also explained above with respect to other services provided).

Auctions may be created against an auction style. The style may control termination conditions and bidding behavior. In one example embodiment, the service may define two styles. A first style may be a simple style that is single timed round. A second style may be a knockout style that may be an infinite times rounds.

A simple auction ends after a single round. The top bidder in that round takes the item. A knockout auction start like a simple auction, however, it does not terminate at the end of the round. The auction continues in a series of knockout rounds. Players only remain eligible to participate in the auction if they bid in each knock out round. If players do not continue to bid, they lose eligibility and are knockedOut of the auction (relates to zoom notifications). The auction only terminates when a round ends with a 0 or 1 bids. The top bidder takes the item.

Games may create custom styles by submitting a pull request.

Auctions may transition through a series of states. For example, in an active state an auction may remain active until closed. In a close state bidding is no longer allowed on the auction. In a reserved state an auction is currently being processed for award. In a claimed state an auction has been awarded.

In some implementation, the reserved state may never be used. The reserved state may exist to provide a barrier during award processing. Many auctions may enter closed state and need to be awarded (e.g., item transmits to the buyer and currency transmits to the seller). Awarding may be handled by N number of consumers. The reserved state may be used to mark an auction as being processed, so that multiple consumers do not select the same auction for processing.

The action server may be configured to notify a game server on specific events. For example, create when an auction has just been created, progress when an auction has progressed from round to round, and closed when an auction has closed.

The auction server may notify zoom connected clients on specific events:

bidPlaced—a player just bid on an auction (targets all eligible bidders)

roundStarted—new auction round has started (targets all eligible bidders)

knockedOut—players have been kicked from an auction (targets all ineligible bidders)

closed—auction has closed (targets all eligible bidders)

claimed—auction has been awarded (targets seller and top bidder)

The knockedOut event may be tied to the knockout style, where the auction progresses through a series of rounds and only terminates once a round ends with 1 or fewer bidders.

The entity being posted for auction may be agnostic to the service, e.g. the data is entirely controlled by the game team. The entity may be flat or nested and complex, but may include all the information required by the types of search and surfacing desired for the game. The parameters the service needs may be:

style—the style of the auction price—the starting price of the auction duration—optional alternate first round duration (override to the style duration)

entity—opaque game entity data.

Since the entity is controlled by the game, some thought should be given around how the data should be surfaced and segmented in the game. Consideration should be given to both data relevancy and size (e.g., number of records surfaced).

It may not be desired that all players see all auctions; rather, players will want to see auctions relevant to them.

Entity data may include meta-data fields required to meet segmentation and surfacing needs. For example: (simplified sports player)

```
{ entity: { power: 3 player: {
age: 28 marketValue: 33907 ovr: 32
playerId: LYN442976 skills: {
awareness: 23 fakeouts: 25 fitness:
24 grip: 23 blocking: 30
receiving: 31 runPower: 23 speed:
24 } } pos: 4 shard: 1 } }
```

Power may be used to segment auction date into tiered levels. Assuming the range is 1-10, you'll only really want to look at auctions with a power equal to or above your current ranking.

Shard may be used to sub-segment the data, limiting the total number seen. On entry, the value may be randomly selected between 1-N. The game can control the overall surfacing of players using a both a power and shard range.

The auction service leverages Finder services. Prior to production, a mapping file may need to be provided for the entity to ensure proper data-typing and indexing behavior.

The auction service may leverage a finder service to provide search functionality. Game teams may define and consume multiple different search templates to provide different data views for in-game features and admin tool features. Search may be only limited by the data present in the entity. It may be recommended that all query templates are versioned with either a number or a timestamp to allow pre-existing clients to continue to function as the query template evolves over the life of the game. At a minimum, a base level template should look something like:

```
{ "size": 100, "query": { "bool": { "must":
[ { "term": { "round":0 } }, { "term": {
"state":2 } } ] } } }
```

Query templates may be populated from dynamic data. Surround dynamic sections with mustache-style triple curly braces pass forward matching data.

Here a developer may swap out 100 with {{{size}}} (remove spaces), and post:

```
{ "params": { "size": 100 }, "queryId":
"example-search" }
```

In other example embodiments, the server system 102 may provide various other services. For example, a track service that includes an analytics service to track in-game actions, a conversations service that includes a chat service for in-game chat, a push notification service for sending push notifications to devices, a localization service to localize game strings, an experiments manager service to help games do A/B testing, etc. A/B testing (e.g., split testing or bucket testing) is a method of comparing two versions of a webpage or app against each other to determine which one performs better. For example, a first set of users may be put through a first code flow and second set of users may be put through a second code flow. Comparing the two may show which flow users like better so that a developer may utilize one flow over another.

Figure 5:
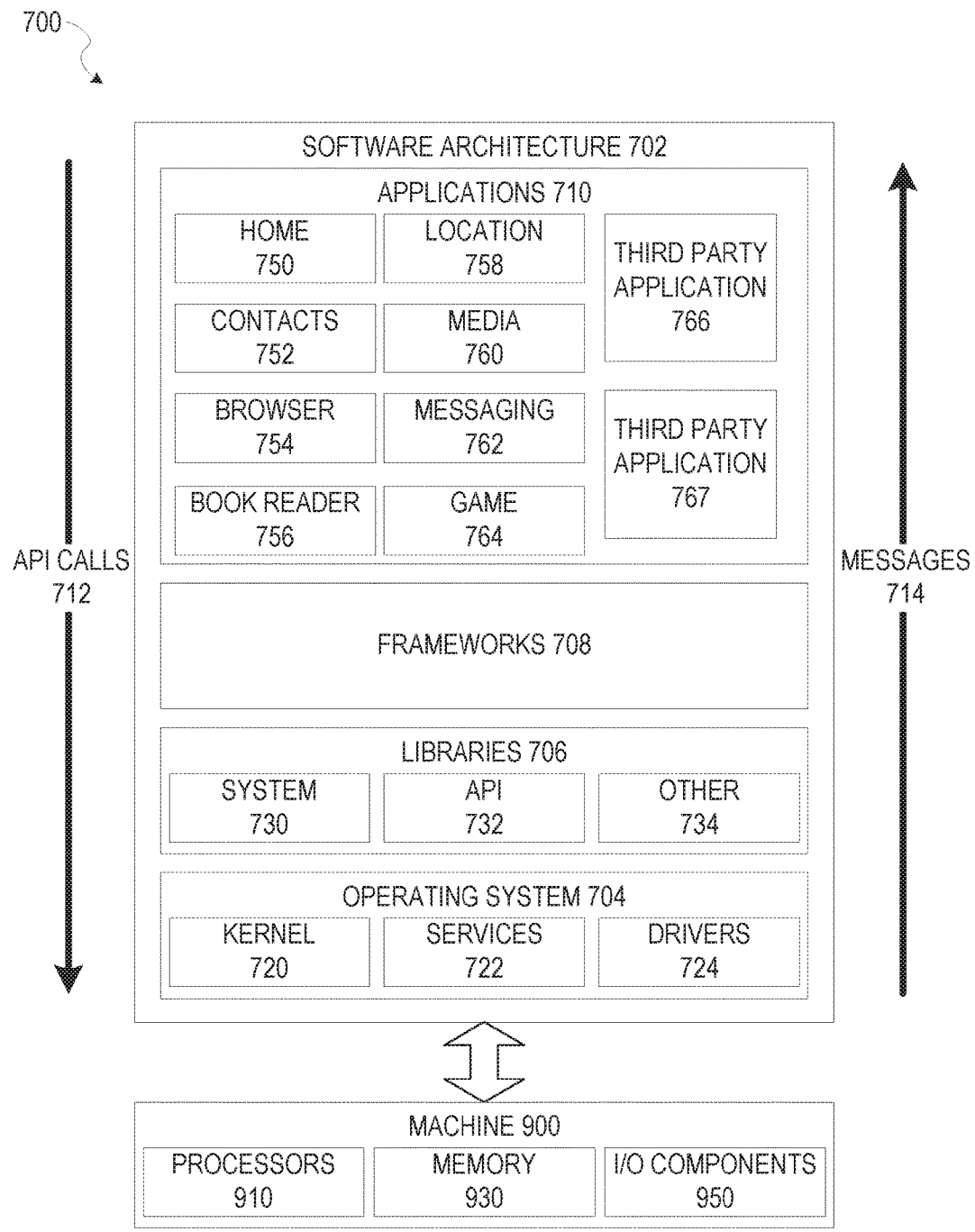
FIG. 5 is a block diagram illustrating an example of a software architecture that may be installed on a machine, according to some example embodiments.

FIG. 5 is a block diagram 700 illustrating an architecture of software 702, which can be installed on any one or more of the devices described above. For example, in various embodiments, client devices 110 and server system 102, and servers 120 and 122, may be implemented using some or all of the elements of software architecture 702. FIG. 5 is merely a non-limiting example of a software architecture, and it will be appreciated that many other architectures can be implemented to facilitate the functionality described herein. In various embodiments, the software architecture 702 is implemented by hardware such as machine 900 of FIG. 6 that includes processors 910, memory 930, and I/O components 950. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers; serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG); or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third party applications 766 and 767. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third party application 766 (e.g., an application developed using the ANDROID™ or IOS™ software development kit (SDK) by an entity other than the vendor of the particular platform) may be mobile software running on a mobile operating system such as IOS™, ANDROD™, WINDOWS® Phone, or another mobile operating system. In this example, the third party application 766 can invoke the API calls 712 provided by the operating system 704 to facilitate functionality described herein.

Figure 6:
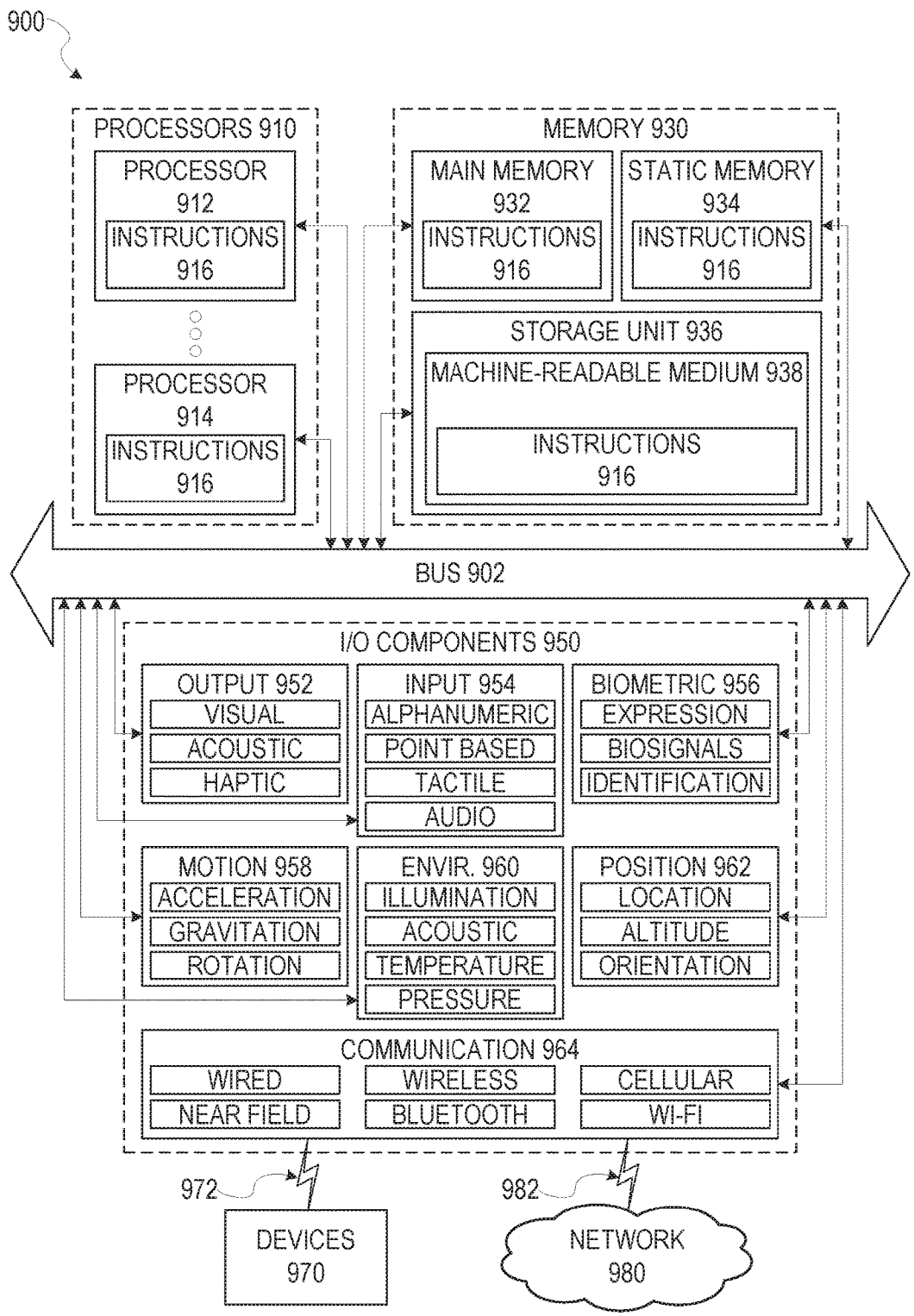
FIG. 6 is a diagrammatic representation of a machine, in the form of a computer system, within which a set of instructions may be executed for causing the machine to perform any one or more of the methodologies discussed herein, according to an example embodiment.

FIG. 6 is a block diagram illustrating components of a machine 900, according to some embodiments, able to read instructions from a machine-readable medium (e.g., a machine-readable storage medium) and perform any one or more of the methodologies discussed herein. Specifically, FIG. 6 shows a diagrammatic representation of the machine 900 in the example form of a computer system, within which instructions 916 (e.g., software, a program, applications 710, an apples, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 120 and 122, etc., or a client device 110 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 6 shows multiple processors 910, the machine 900 may include a single processor 910 with a single core, a single processor 910 with multiple cores (e.g., a multi-core processor 910), multiple processors 912, 914 with a single core, multiple processors 910, 912 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (RUM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another.

Additionally, since the machine-readable medium 938 is tangible, the medium 938 may be considered to be a machine-readable device.

Figure 7:
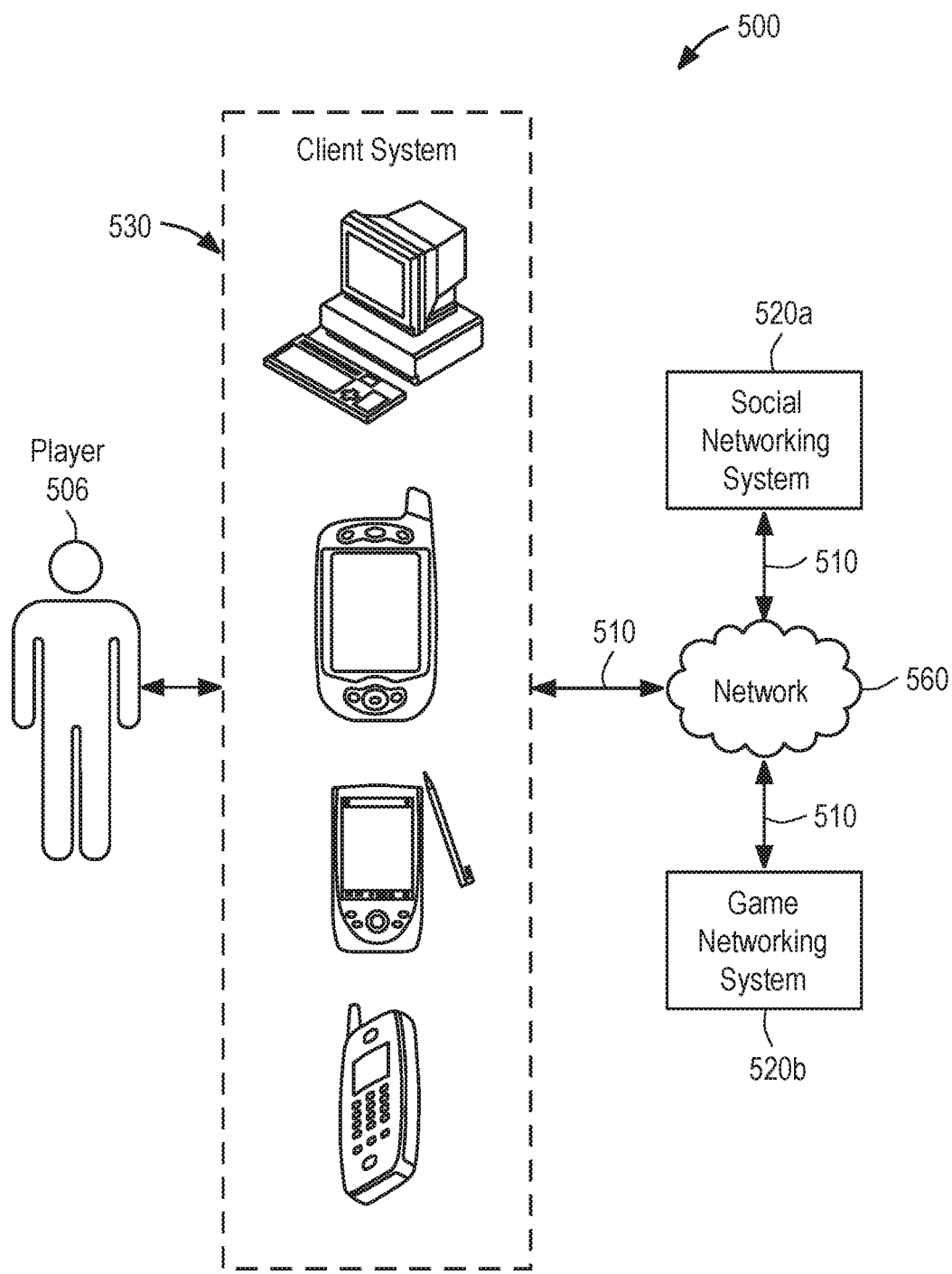
FIG. 7 is a schematic diagram showing an example of a system, according to some example embodiments.

Embodiments described herein may operate and provide services for online games and game systems. FIG. 7 is a schematic diagram showing an example of such a system 500. For example, server system 102 of FIG. 1 may be part of or coupled with game networking system 520b, client devices 110 of FIG. 1 may be part of the client system 530, and the user (or player) 106 of FIG. 1 may include player 506.

FIG. 7 illustrates an example of a system for implementing various disclosed embodiments. In particular embodiments, system 500 comprises player 506, social networking system 520a, game networking system 520b, client system 530, and network 560. The components of system 500 can be connected to each other in any suitable configuration, using any suitable type of connection. The components may be connected directly or over a network 560, which may be any suitable network. For example, one or more portions of network 560 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 520a is a network-addressable computing system that can host one or more social graphs. Social networking system 520a can generate, store, receive, and transmit social networking data. Social networking system 520a can be accessed by the other components of system 500 either directly or via network 560. Game networking system 520b is a network-addressable computing system that can host one or more online games. Game networking system 520b can generate, store, receive, and transmit game-related data, such as, for example, game account data, game input, game state data, and game displays. Game networking system 520b can be accessed by the other components of system 500 either directly or via network 560. Player 506 may use client system 530 to access, send data to, and receive data from social networking system 520a and game networking system 520b. Client system 530 can access social networking system 520a or game networking system 520b directly, via network 560, or via a third-party system. As an example and not by way of limitation, client system 530 may access game networking system 520b via social networking system 520a. Client system 530 can be any suitable computing device, such as a personal computer, laptop, cellular phone, smart phone, computing tablet, etc.

Although FIG. 7 illustrates a particular number of players 506, social networking systems 520a, game networking systems 520b, client systems 530, and networks 560, this disclosure contemplates any suitable number of players 506, social networking systems 520a, game networking systems 520b, client systems 530, and networks 560. As an example and not by way of limitation, system 500 may include one or more game networking systems 520b and no social networking systems 520a. As another example and not by way of limitation, system 500 may include a system that comprises both social networking system 520a and game networking system 520b. Moreover, although FIG. 7 illustrates a particular arrangement of player 506, social networking system 520a, game networking system 520b, client system 530, and network 560, this disclosure contemplates any suitable arrangement of player 506, social networking system 520a, game networking system 520b, client system 530, and network 560.

The components of system 500 may be connected to each other using any suitable connections 510. For example, suitable connections 510 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 510 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 510 need not necessarily be the same throughout system 500. One or more first connections 510 may differ in one or more respects from one or more second connections 510. Although FIG. 7 illustrates particular connections between player 506, social networking system 520a, game networking system 520b, client system 530, and network 560, this disclosure contemplates any suitable connections between player 506, social networking system 520a, game networking system 520b, client system 530, and network 560. As an example and not by way of limitation, in particular embodiments, client system 530 may have a direct connection to social networking system 520a or game networking system 520b, bypassing network 560.

In an online computer game, a game engine manages the game state of the game. Game state comprises all game play parameters, including player character state, non-player character (NPC) state, in-game object state, game world state (e.g., internal game clocks, game environment), and other game play parameters. Each player 506 controls one or more player characters (PCs). The game engine controls all other aspects of the game, including non-player characters (NPCs) and in-game objects. The game engine also manages game state, including player character state for currently active (online) and inactive (offline) players.

An online game can be hosted by game networking system 520b, which can be accessed using any suitable connection with a suitable client system 530. A player (e.g., player 506) may have a game account on game networking system 520b, wherein the game account can contain a variety of information associated with the player (e.g., the player's personal information, financial information, purchase history, player character state, game state). In some embodiments, a player may play multiple games on game networking system 520b, which may maintain a single game account for the player with respect to all the games, or multiple individual game accounts for each game with respect to the player. In some embodiments, game networking system 520h can assign a unique identifier to each player 506 of an online game hosted on game networking system 520b. Game networking system 520b can determine that a player 506 is accessing the online game by reading the user's cookies, which may be appended to HTTP requests transmitted by client system 530, and/or by the player 506 logging onto the online game.

In particular embodiments, player 506 may access an online game and control the game's progress via client system 530 (e.g., by inputting commands to the game at the client device). Client system 530 can display the game interface, receive inputs from player 506, transmit user inputs or other events to the game engine, and receive instructions from the game engine. The game engine can be executed on any suitable system (such as, for example, client system 530, social networking system 520a, or game networking system 520b). As an example and not by way of limitation, client system 530 can download client components of an online game, which are executed locally, while a remote game server, such as game networking system 520b, provides backend support for the client components and may be responsible for maintaining application data of the game, processing the inputs from the player 506, updating and/or synchronizing the game state based on the game logic and each input from the player 506, and transmitting instructions to the client system 530. As another example and not by way of limitation, each time player 506 provides an input to the game through the client system 530 (such as, for example, by typing on the keyboard or clicking the mouse of client system 530), the client components of the game may transmit the player's input to the game networking system 520b.

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 506 may access particular game instances of an online game. A game instance is a copy of a specific game play area that is created during runtime. In particular embodiments, a game instance is a discrete game play area where one or more players 506 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 506 and one or more in-game objects controlled by the game engine. When accessing an online game, the game engine may allow player 506 to select a particular game instance to play from a plurality of game instances. Alternatively, the game engine may automatically select the game instance that player 506 will access. In particular embodiments, an online game comprises only one game instance that all players 506 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure includes any suitable social graph users.

The minimum number of edges needed to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, social networking system 520a or game networking system 520b). In one embodiment, Nmax equals 1, such that the player's social network includes only first-degree friends. In another embodiment, Nmax is unlimited and the player's social network is coextensive with the social graph.

In particular embodiments, the social graph is managed by game networking system 520b, which is managed by the game operator. In other embodiments, the social graph is part of a social networking system 520a managed by a third party (e.g., Facebook, Friendster, Myspace). In yet other embodiments, player 506 has a social network on both game networking system 520b and social networking system 520a, wherein player 506 can have a social network on the game networking system 520b that is a subset, superset, or independent of the player's social network on social networking system 520a. In such combined systems, game networking system 520b can maintain social graph information with edge type attributes that indicate whether a given friend is an "in-game friend," an "out-of-game friend," or both. The various embodiments disclosed herein are operable when the social graph is managed by social networking system 520a, game networking system 520b, or both.

Figure 8:
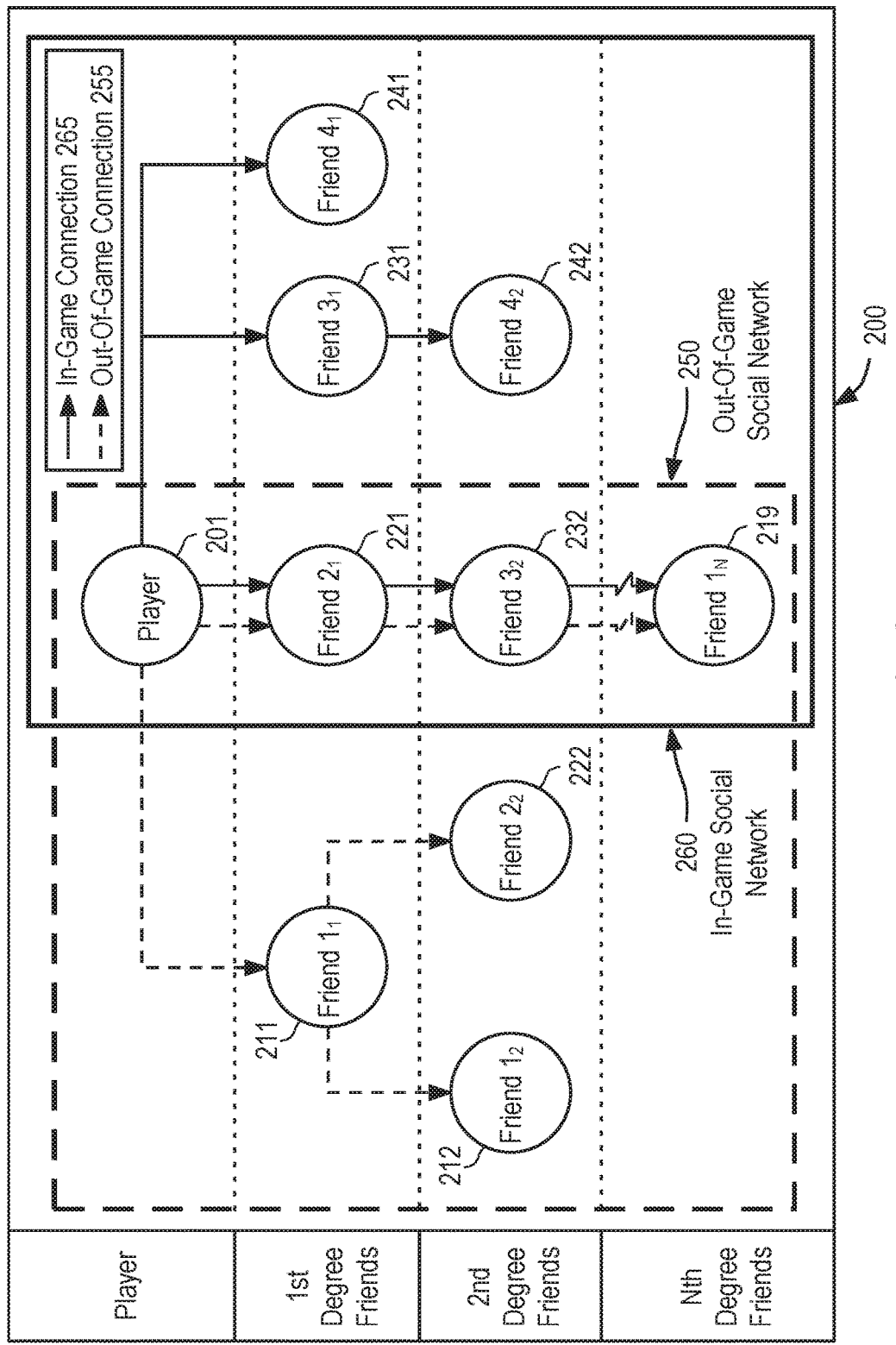
FIG. 8 is a schematic diagram showing an example of a social network within a social graph, according to some embodiments.

FIG. 8 shows an example of a social network 250 within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player" and "user" can be used interchangeably and can refer to any user or character in an online multiuser game system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out-of-game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Figure 9:
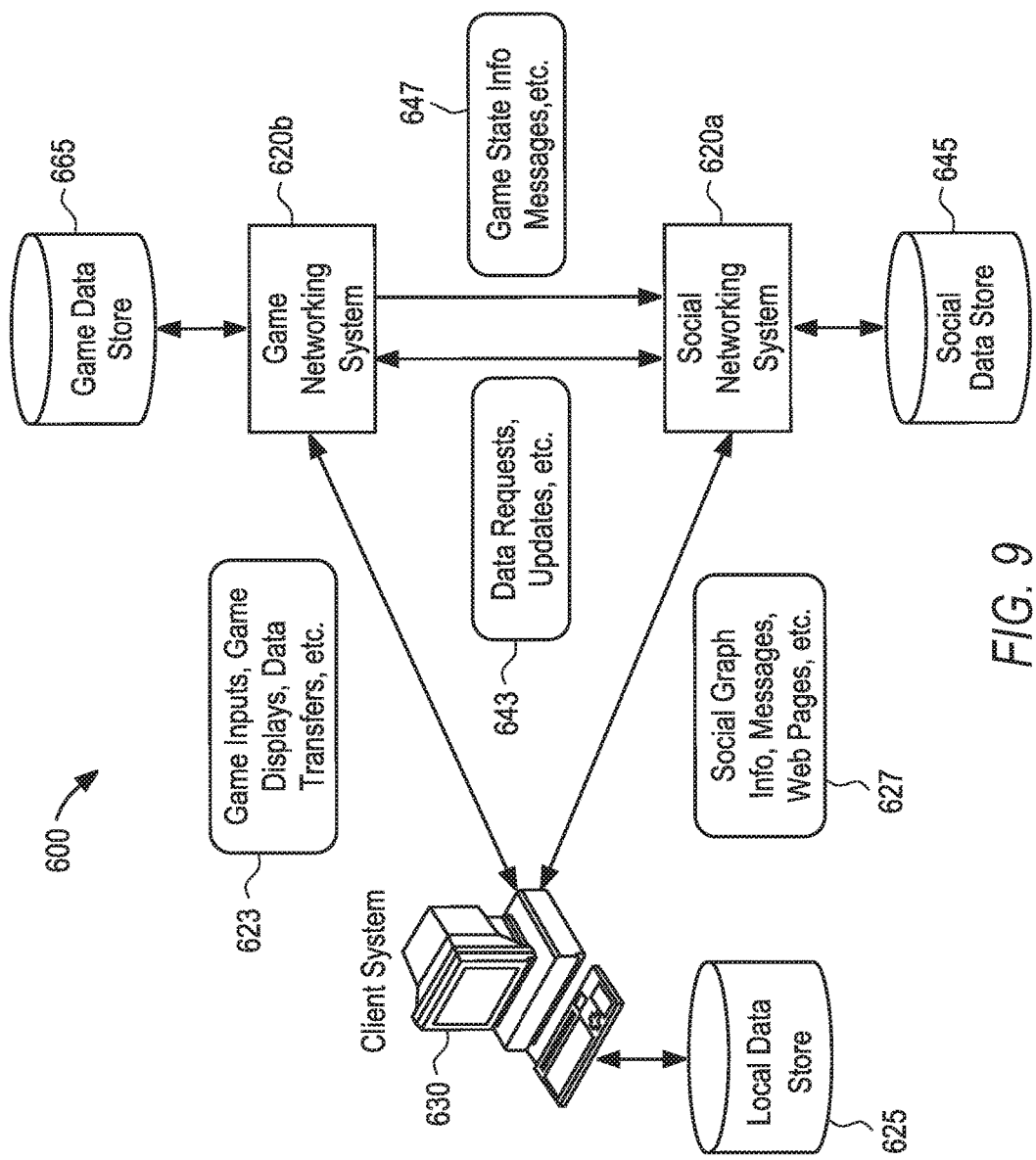
FIG. 9 is a diagrammatic representation of an example data flow between example components of the example system of FIG. 7, according to some example embodiments.

FIG. 9 illustrates an example data flow between the components of system 600. In particular embodiments, system 600 can include client system 630, social networking system 620a, and game networking system 620b. The components of system 600 can be connected to each other in any suitable configuration, using any suitable type of connection. The components may be connected directly or over any suitable network. Client system 630, social networking system 620a, and game networking system 620b can each have one or more corresponding data stores such as local data store 625, social data store 645, and game data store 665, respectively. The local data store 625 and game data store 665 contains player-based information that may be used to determine the difficulty level for the specific player. Social networking system 620a and game networking system 620b can also have one or more servers that can communicate with client system 630 over an appropriate network. Social networking system 620a and game networking system 620b can have, for example, one or more Internet servers for communicating with client system 630 via the Internet. Similarly, social networking system 620a and game networking system 620b can have one or more mobile servers for communicating with client system 630 via a mobile network (e.g., GSM, PCS, WPAN, etc.) some embodiments, one server may be able to communicate with client system 630 over both the Internet and a mobile network. In other embodiments, separate servers can be used.

Client system 630 can receive and transmit data 623 to and from game networking system 620k This data can include, for example, webpages, messages, game inputs, game displays, HTTP packets, data requests, transaction information, updates, and other suitable data. At some other time, or at the same time, game networking system 620b can communicate data 643, 647 (e.g., game state information, game system account information, page info, messages, data requests, updates, etc) with other networking systems, such as social networking system 620a (e.g., Facebook, Myspace, etc.). Client system 630 can also receive and transmit data 627 to and from social networking system 620a. This data can include, for example, webpages, messages, social graph information, social network displays, HTTP packets, data requests, transaction information, updates, and other suitable data.

Communication between client system 630, social networking system 620a, and game networking system 620b can occur over any appropriate electronic communication medium or network using any suitable communications protocols. For example, client system 630, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TEL-NET, and a number of other protocols, may be used. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 620b, the BLOB containing the game state for the instance corresponding to the player can be transmitted to client system 630 for use by a client-side executed object to process. In particular embodiments, the client-side executable may be a FLASH-based game, which can de-serialize the game state data in the BLOB. As a player plays the game, the game logic implemented at client system 630 maintains and modifies the various game state parameters locally. The client-side game logic may also batch game events, such as mouse clicks, and transmit these events to game networking system 620b. Game networking system 620b may itself operate by retrieving a copy of the BLOB from a database or an intermediate memory cache (memcache) layer. Game networking system 620b can also de-serialize the BLOB to resolve the game state parameters and execute its own game logic based on the events in the batch file of events transmitted by the client to synchronize the game state on the server side. Game networking system 620b may then re-serialize the game state, now modified, into a BLOB and pass this to a memory cache layer for lazy updates to a persistent database.

With a client-server environment in which the online games may run, one server system, such as game networking system 620b, may support multiple client systems 630. At any given time, there may be multiple players at multiple client systems 630 all playing the same online game. In practice, the number of players playing the same game at the same time may be very large. As the game progresses with each player, multiple players may provide different inputs to the online game at their respective client systems 630, and multiple client systems 630 may transmit multiple player inputs and/or game events to game networking system 620b for further processing. In addition, multiple client systems 630 may transmit other types of application data to game networking system 620b.

In particular embodiments, a computer-implemented game may be a text-based or turn-based game implemented as a series of web pages that are generated after a player selects one or more actions to perform. The web pages may be displayed in a browser client executed on client system 630. As an example and not by way of limitation, a client application downloaded to client system 630 may operate to serve a set of web pages to a player. As another example and not by way of limitation, a computer-implemented game may be an animated or rendered game executable as a stand-alone application or within the context of a web page or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described web pages may be associated with or accessed by social networking system 620a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 630, either caused by an action of a game player or by the game logic itself, client system 630 may need to inform game networking system 620b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 600 is discussed in reference to updating a multi-player online game hosted on a network-addressable system (such as, for example, social networking system 620a or game networking system 620b), where an instance of the online game is executed remotely on a client system 630, which then transmits application event data to the hosting system such that the remote game server synchronizes game state associated with the instance executed by the client system 630.

In a particular embodiment, one or more objects of a game may be represented as an Adobe Flash object, Flash may manipulate vector and raster graphics, and supports bidirectional streaming of audio and video. "Flash" may mean the authoring environment, the player, or the application files. In particular embodiments, client system 630 may include a Flash client. The Flash client may be configured to receive and run Flash application or game object code from any suitable networking system (such as, for example, social networking system 620a or game networking system 620b). In particular embodiments, the Flash client may be run in a browser client executed on client system 630. A player can interact with Flash objects using client system 630 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 630, the Flash client may send the events that caused the game state changes to the in-game object to game networking system 620b. However, to expedite the processing and hence the speed of the overall gaming experience, the Flash client may collect a batch of some number of events or updates into a batch file. The number of events or updates may be determined by the Flash client dynamically or determined by game networking system 620b based on server loads or other factors. For example, client system 630 may send a batch file to game networking system 620b whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at the client system 630. In particular embodiments, the batch file may be a text file and the name-value pairs may be in string format.

In particular embodiments, when a player plays an online game on the client system 630, the game networking system 620b may serialize all the game-related data, including, for example and without limitation, game states, game events, user inputs, for this particular user and this particular game, into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, the game networking system 620b may retrieve the corresponding BLOB from the database to determine the most-recent values of the game-related data. In particular embodiments, while a player is playing the online game, the game networking system 620b may also load the corresponding BLOB into a memory cache so that the game system may have faster access to the BLOB and the game-related data contained therein.

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 10:
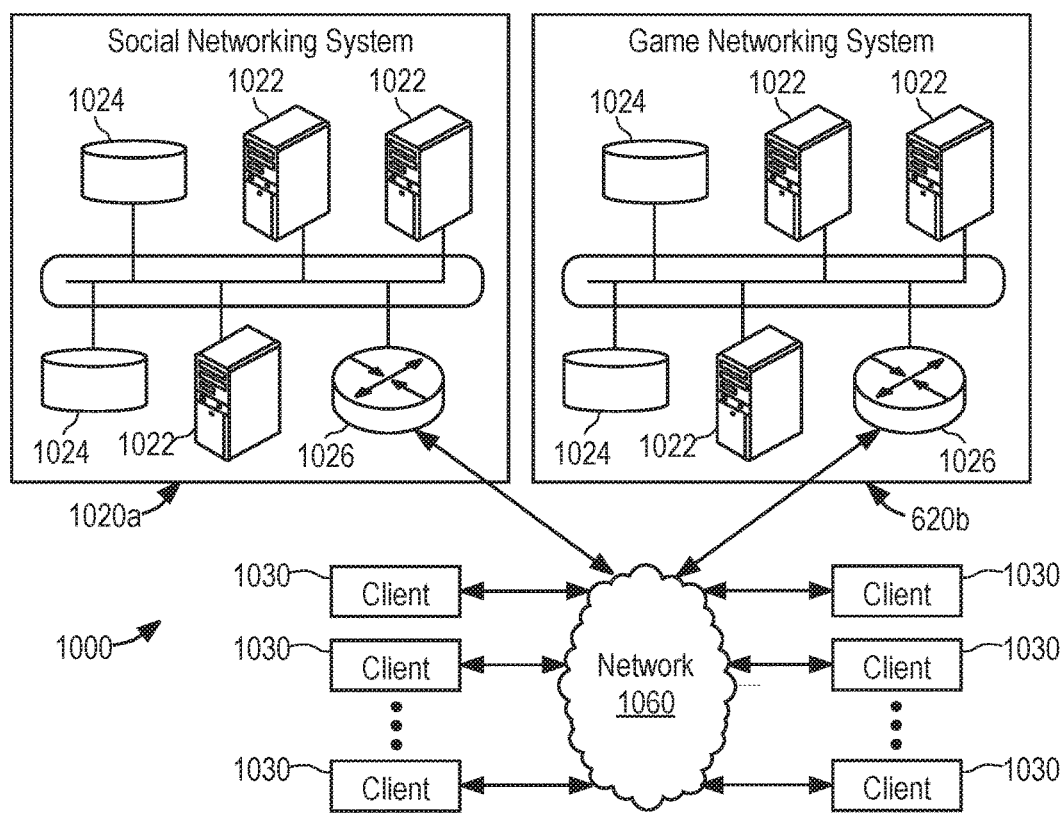
FIGS. 10-11 are schematic diagrams showing an example network environment, in which various example embodiments may operate, according to some example embodiments.

Particular embodiments may operate in a wide area network environment, such as the Internet, including multiple network addressable systems. FIG. 10 illustrates an example network environment 1000, in which various example embodiments may operate. Network cloud 1060 generally represents one or more interconnected networks, over which the systems and hosts described herein can communicate. Network cloud 1060 may include packet-based wide area networks (such as the Internet), private networks, wireless networks, satellite networks, cellular networks, paging networks, and the like. As FIG. 10 illustrates, particular embodiments may operate in a network environment 1000 comprising one or more networking systems, such as social networking system 1020a; game networking system 1020b, and one or more client systems 1030. The components of social networking system 1020a and game networking system 1020b operate analogously; as such, hereinafter they may be referred to simply as networking system 1020. Client systems 1030 are operably connected to the network environment 1000 via a network service provider, a wireless carrier, or any other suitable means.

Networking system 1020 is a network addressable system that, in various example embodiments, comprises one or more physical servers 1022 and data stores 1024. The one or more physical servers 1022 are operably connected to computer network 1060 via, by way of example, a set of routers and/or networking switches 1026. In an example embodiment, the functionality hosted by the one or more physical servers 1022 may include web or HTTP servers, FTP servers, as well as, without limitation; web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 1022 may host functionality directed to the operations of networking system 1020. Hereinafter servers 1022 may be referred to as server 1022, although server 1022 may include numerous servers hosting, for example, networking system 1020, as well as other content distribution servers, data stores, and databases. Data store 1024 may store content and data relating to, and enabling, operation of networking system 1020 as digital data objects. A data object; in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 1024 corresponds to one or more of a variety of separate and integrated databases, such as relational databases and object-oriented databases, that maintain information as an integrated collection of logically related records or files stored on one or more physical systems. Structurally, data store 1024 may generally, include one or more of a large class of data storage and management systems. In particular embodiments, data store 1024 may be implemented by any suitable physical system(s) including components, such as one or more database servers, mass storage media, media library systems, storage area networks, data storage clouds, and the like. In one example embodiment, data store 1024 includes one or more servers, databases (e.g., MySQL), and/or data warehouses. Data store 1024 may include data associated with different networking system 1020 users and/or client systems 1030.

Client system 1030 is generally a computer or computing device including functionality for communicating (e.g., remotely) over a computer network. Client system 1030 may be a desktop computer, laptop computer, personal digital assistant (PDA), in- or out-of-car navigation system, smart phone or other cellular or mobile phone, or mobile gaming device, among other suitable computing devices. Client system 1030 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 1030 to enter addresses of specific network resources to be retrieved, such as resources hosted by networking system 1020. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

A web page or resource embedded within a web page, which may itself include multiple embedded resources, may include data records, such as plain textual information, or more complex digitally encoded multimedia content, such as software programs or other code objects, graphics, images, audio signals, videos, and so forth. One prevalent markup language for creating web pages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a web page may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 1030 desires to view a particular web page (hereinafter also referred to as target structured document) hosted by networking system 1020, the user's web browser, or other document rendering engine or suitable client application, formulates and transmits a request to networking system 1020. The request generally includes a URL or other document identifier as well as metadata or other information. By way of example, the request may include information identifying the user, such as a user ID, as well as information identifying or characterizing the web browser or operating system running on the user's client computing device 1030. The request may also include location information identifying a geographic location of the user's client system or a logical network location of the user's client system. The request may also include a timestamp identifying when the request was transmitted.

Although the example network environment described above and illustrated in FIG. 10 is described with respect to social networking system 1020a and game networking system 1020b, this disclosure encompasses any suitable network environment using any suitable systems. As an example and not by way of limitation, the network environment may include online media systems, online reviewing systems, online search engines, online advertising systems, or any combination of two or more such systems.

Figure 11:
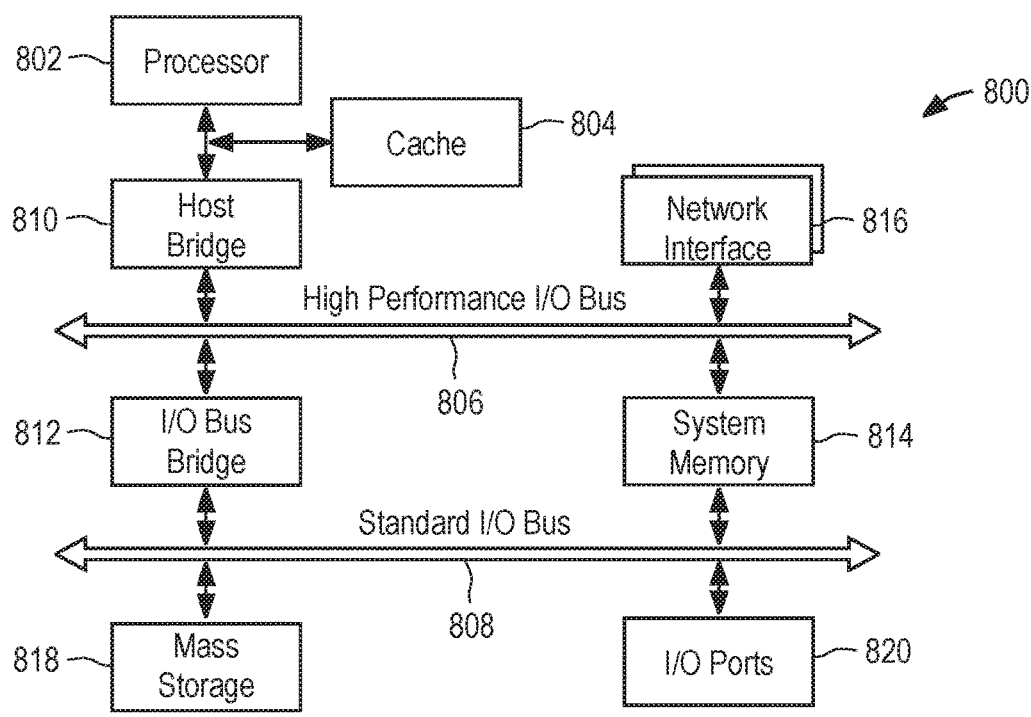

FIG. 11 illustrates an example computing system architecture, which may be used to implement a server 1022 or a client system 1030. In one embodiment, hardware system 800 comprises a processor 802, a cache memory 804, and one or more executable modules and drivers, stored on a tangible computer readable medium, directed to the functions described herein. Additionally, hardware system 800 may include a high performance input/output (I/O) bus 806 and a standard I/O bus 808. A host bridge 810 may couple processor 802 to high performance I/O bus 806, whereas I/O bus bridge 812 couples the two buses 806 and 808 to each other. A system memory 814 and one or more network/communication interfaces 816 may couple to bus 806. Hardware system 800 may further include video memory (not shown) and a display device coupled to the video memory. Mass storage 818 and I/O ports 820 may couple to bus 808. Hardware system 800 may optionally include a keyboard, a pointing device, and a display device (not shown) coupled to bus 808. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 800 are described in greater detail below. In particular, network interface 816 provides communication between hardware system 800 and any of a wide range of networks, such as an Ethernet (e.g., IEEE 802.3) network, a backplane, etc. Mass storage 818 provides permanent storage for the data and programming instructions to perform the above-described functions implemented in servers whereas system memory 814 (e.g., DRAM) provides temporary storage for the data and programming instructions when executed by processor 802. I/O ports 820 are one or more serial and/or parallel communication ports that provide communication between additional peripheral devices, which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module," with processor 802 being referred to as the "processor core." Furthermore, certain embodiments of the present disclosure may not require or include all of the above components. For example, the peripheral devices shown coupled to standard I/O bus 808 may couple to high performance I/O bus 806. In addition, in some embodiments, only a single bus may exist, with the components of hardware system 800 being coupled to the single bus. Furthermore, hardware system 800 may include additional components, such as additional processors, storage devices, or memories.

An operating system manages and controls the operation of hardware system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. method for providing multitenancy gaming platform services, comprising:
   generating, by a first server computer, a new application identifier for an application for accessing a plurality of multitenancy gaming platform services;
   storing, by the first server computer, the new application identifier and associating the new application identifier with the application;
   receiving, by the first server computer, a request for a new token from a client device running the application, the request including a user identifier;
   generating, by the first server computer, the new token including the user identifier;
   sending, by the first server computer, the new token to the client device running the application;
   receiving, by the first server computer from the client device running the application, a request for a service to perform an operation for the application, the request including the new token, data related to the application, and a target user identifier associated with user data upon which the operation should apply the data related to the application;
   decoding, by the first server computer, the token to determine the application identifier and the user identifier;
   authenticating, by the first server computer, the application identifier and user identifier;
   determining, by the first server computer, which service of the plurality of multitenancy gaming platform services is requested;
   sending, by the first server computer, the data related to the application to a second server computer responsible for the service, wherein the operation is authorized by the second server computer based on the user identifier and target user identifier, and the operation is performed by the service; and
   receiving, by the first server computer, a response from the second server computer responsible for the service, indicating a status of the operation.

2. The method of claim 1, wherein before generating the new application identifier, the method comprises:
   receiving a request from a client device for the new application identifier.

3. The method of claim 1, wherein
   the new token expires after a predetermined amount of time.

4. The method of claim 1 wherein the request for the service further includes a Check and Set (CAS) value, and wherein the method further comprises:
   authenticating the CAS value against a stored CAS value; and
   sending the data related to the application to the second server computer responsible for the service if the CAS value matches the stored CAS value.

5. The method of claim 4, further comprising:
   receiving an updated CAS value from the server computer responsible for the service;
   replacing the stored CAS value with the updated CAS value; and
   sending the updated CAS value to a client device.

6. The method of claim 1, wherein authorizing the operation based on the user identifier and target user identifier comprises determining that the user identifier matches the target user identifier.

7. The method of claim 1, further comprising:
   determining that the operation associated with the service requires that the user identifier and target user identifier match; and
   authorizing the user identifier if it matches the target user identifier.

8. The method of claim 1, further comprising:
   determining that the operation associated with the service does not require that the user identifier and target user identifier match; and
   authorizing the user identifier even if the user identifier does not match the target user identifier.

9. The method of claim 1, wherein the target user identifier is the user identifier for the operation to act upon.

10. The method of claim 1, wherein the service includes one or more of a group comprising: storage of a game state, creating a leaderboard, updating a user score, and accessing a leaderboard.

11. A server computer comprising:
    one or more processors; and
    a computer readable medium coupled with the one or more processors, the computer readable medium comprising instructions stored thereon that are executable by the one or more processors to cause a computing device to perform operations comprising:
    generating a new application identifier for an application for accessing a plurality of multitenancy gaming platform services;
    storing the new application identifier and associating the new application identifier with the application;
    receiving a request for a new token from a client device running the application, the request including a user identifier;
    generating the new token including the user identifier;
    sending the new token to the client device running the application;
    receiving, by the first server computer from the client device running the application, a request for a service to perform an operation for the application, the request including the new token, data related to the application, and a target user identifier associated with user data upon which the operation should apply the data related to the application;
    decoding the token to determine the application identifier and the user identifier;
    authenticating the application identifier and user identifier;
    determining which service of the plurality of multitenancy gaming platform services is requested;
    sending the data related to the application to a second server computer responsible for the service, wherein the operation is authorized by the second server computer based on the user identifier and target user identifier, and the operation is performed by the service; and
    receiving a response from the second server computer responsible for the service, indicating a status of the operation.

12. The server computer of claim 11, wherein before generating the new application identifier, the operations comprise:
    receiving a request from a client device for the new application identifier.

13. The server computer of claim 11, wherein the new token expires after a predetermined amount of time.

14. The server computer of claim 11, wherein the request for the service further includes a Check and Set (CAS) value, and wherein the operations further comprise:
   authenticating the CAS value against a stored CAS value; and
   sending the data related to the application to the second server computer responsible for the service if the CAS value matches the stored CAS value.

15. The server computer of claim 14, wherein the operations further comprise:
   receiving an updated CAS value from the server computer responsible for the service;
   replacing the stored CAS value with the updated CAS value; and
   sending the updated CAS value to a client device.

16. The server computer of claim 11, wherein authorizing the operation based on the user identifier and target user identifier comprises determining that the user identifier matches the target user identifier.

17. The server computer of claim 11, wherein the operations further comprise:
   determining that the operation associated with the service requires that the user identifier and target user identifier match; and
   authorizing the user identifier if it matches the target user identifier.

18. The server computer of claim 11, wherein the operations further comprise:
   determining that the operation associated with the service does not require that the user identifier and target user identifier match; and
   authorizing the user identifier even if the user identifier does not match the target user identifier.

19. The server computer of claim 11, wherein the target user identifier is the user identifier for the operation to act upon.

20. A non-transitory computer readable medium comprising instructions stored thereon that are executable by one or more processors to cause a computing device to perform operations comprising:
   generating a new application identifier for an application for accessing plurality of multitenancy gaming platform services;
   storing the new application identifier and associating the new application identifier with the application;
   receiving a request for a new token from a client device running the application, the request including a user identifier;
   generating the new token including the user identifier;
   sending the new token to the client device running the application;
   receiving, by the first server computer from the client device running the application, a request for a service to perform an operation for the application, the request including the new token, data related to the application, and a target user identifier associated with user data upon which the operation should apply the data related to the application;
   decoding the token to determine the application identifier and the user identifier;
   authenticating the application identifier and user identifier;
   determining which service of the plurality of multitenancy gaming platform services is requested;
   sending the data related to the application to a second server computer responsible for the service, wherein the operation is authorized by the second server computer based on the user identifier and target user identifier, and the operation is performed by the service; and
   receiving a response from the second server computer responsible for the service, indicating a status of the operation.

* * * * *

UNITED STATES PATENT AND TRADEMARK OFFICE
CERTIFICATE OF CORRECTION

| | | |
|---|---|---|
| PATENT NO. | : 10,182,460 B2 | Page 1 of 3 |
| APPLICATION NO. | : 15/069193 | |
| DATED | : January 15, 2019 | |
| INVENTOR(S) | : Apte et al. | |

It is certified that error appears in the above-identified patent and that said Letters Patent is hereby corrected as shown below:

In the Drawings

On sheet 10 of 11, Fig. 10, reference numeral 620b, Line 1, delete "620b" and insert --1020b-- therefor In the Specification In Column 2, Line 32, delete "he" and insert --be-- therefor In Column 3, Line 39, delete "sonic" and insert --some-- therefor In Column 5, Line 42, delete "CURL" and insert --cURL-- therefor In Column 5, Line 50, before "e.g.,", insert --(--

In Column 7, Line 40, delete "luckless" and insert --lockless-- therefor

In Column 7, Line 54, delete "GAS" and insert --CAS-- therefor

In Column 8, Line 31, delete "get;" and insert --get,-- therefor

In Column 9, Line 9, delete "adtninEdit=(true/false)" and insert --adminEdit=(true/false)-- therefor In Column 12, Line 18, delete "API," and insert --API.-- therefor In Column 13, Line 15, delete "(infinite')" and insert --('infinite')-- therefor In Column 14, Lines 44-45, delete "'daily≤northamerica'," and insert --'daily---northamerica',-- therefor In Column 15, Line 44, delete "{"incr": 7}." and insert --{"incr": 7}-- therefor Signed and Sealed this
Twelfth Day of January, 2021

Andrei Iancu
*Director of the United States Patent and Trademark Office*

In Column 18, Line 55, delete "structured." and insert --structured-- therefor

In Column 21, Line 16, delete "invite" and insert --Invite-- therefor

In Column 21, Line 57, delete "meta;" and insert --meta,-- therefor

In Column 22, Line 13, delete "hops" and insert --https-- therefor

In Column 25, Line 31, delete "URI," and insert --URL-- therefor

In Column 25, Lines 55-56, delete "Open/Closed." and insert --Open/Closed-- therefor In Column 27, Line 45, delete ""BigBomb1.":" and insert --"BigBomb1":-- therefor In Column 29, Line 15, delete "by," and insert --by-- therefor In Column 32, Line 30, delete "drivers;" and insert --drivers,-- therefor In Column 32, Line 46, delete "JPG);" and insert --JPG),-- therefor In Column 33, Line 15, delete "ANDRODTM," and insert --ANDROIDTM,-- therefor In Column 33, Line 28, delete "apples," and insert --applet,-- therefor In Column 34, Line 27, delete "(RUM)," and insert --(ROM),-- therefor In Column 35, Line 23, before "e.g.,", insert --(--

In Column 35, Line 32, before "infrared", insert --(e.g.,--

In Column 38, Line 56, delete "520h" and insert --520b-- therefor

In Column 43, Line 27, after "PCS,", insert --Wi-Fi,--

In Column 43, Line 27, delete "etc.)" and insert --etc.). In-- therefor

In Column 43, Line 33, delete "620k" and insert --620b.-- therefor

In Column 43, Line 40, delete "etc)" and insert --etc.)-- therefor

In Column 45, Line 40, delete "object," and insert --object.-- therefor

In Column 47, Line 10, delete "1020a;" and insert --1020a,-- therefor

In Column 47, Line 26, delete "limitation;" and insert --limitation,-- therefor

CERTIFICATE OF CORRECTION (continued)
U.S. Pat. No. 10,182,460 B2

In Column 47, Line 41, delete "object;" and insert --object,-- therefor

In Column 47, Line 55, delete "generally," and insert --generally-- therefor

In Column 48, Line 64, delete "1020h," and insert --1020b,-- therefor

In the Claims

In Column 51, Line 6, in Claim 1, before "method", insert --A--

In Column 54, Line 6, in Claim 20, before "plurality", insert --a--